United States Patent
Watanabe et al.

(10) Patent No.: US 7,664,817 B2
(45) Date of Patent: Feb. 16, 2010

(54) INFORMATION DISTRIBUTION METHOD AND DEVICE

(75) Inventors: Satoru Watanabe, Kawasaki (JP);
Masatomo Yasaki, Kawasaki (JP);
Soichi Nishiyama, Kawasaki (JP);
Kazuki Matsui, Kawasaki (JP);
Toshiaki Gomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 734 days.

(21) Appl. No.: 10/067,297

(22) Filed: Feb. 7, 2002

(65) Prior Publication Data
US 2003/0093482 A1 May 15, 2003

(30) Foreign Application Priority Data
Oct. 31, 2001 (JP) ............................. 2001-335072

(51) Int. Cl.
*G06F 15/16* (2006.01)
(52) U.S. Cl. .................. 709/206; 709/203; 709/204; 709/205
(58) Field of Classification Search .......... 709/203–206
See application file for complete search history.

(56) References Cited
U.S. PATENT DOCUMENTS

| | | | |
|---|---|---|---|
| 6,158,011 A * | 12/2000 | Chen et al. ................. 726/15 |
| 6,487,600 B1 * | 11/2002 | Lynch ......................... 709/229 |
| 6,912,564 B1 * | 6/2005 | Appelman et al. .......... 709/204 |
| 7,047,406 B2 * | 5/2006 | Schleicher et al. .......... 713/168 |
| 2002/0023132 A1 * | 2/2002 | Tornabene et al. .......... 709/205 |
| 2002/0066026 A1 * | 5/2002 | Yau et al. ..................... 713/201 |
| 2002/0120783 A1 * | 8/2002 | Evgey ........................ 709/247 |
| 2003/0004916 A1 * | 1/2003 | Lewis ............................. 707/1 |

FOREIGN PATENT DOCUMENTS

| | | |
|---|---|---|
| JP | 11-066158 | 3/1999 |
| JP | 11-196124 | 7/1999 |
| JP | 2001-175747 | 6/2001 |
| JP | 2001-243134 | 9/2001 |

* cited by examiner

*Primary Examiner*—Ario Etienne
*Assistant Examiner*—Sahera Halim
(74) *Attorney, Agent, or Firm*—Staas & Halsey LLP

(57) ABSTRACT

Network information-distribution method and device for transmitting information utilizing information-exchange relationships among users. Information is transmitted from user 1 to all or a portion of user 1's buddies, e.g., users 12 and 13. Next, having received the information, users 12 and 13 then forward the information to their respective buddies. The information is forwarded, for example, to users 211 and 212 registered on user 12's buddy list 21. Likewise, the information is also transmitted to the user group registered on user 13's buddy list 22. By repeating this, buddy lists expressing information-exchange relationships among users are utilized to distribute the information to great numbers of persons.

24 Claims, 23 Drawing Sheets

Instant Message Service: Needs-Message Creation http://www.instantmessage/needsmessage/create.html! UID=2000000034&MID=1

● Needs-Message Creation
◎ Select Greeting                    Add/Update/Delete Greeting

| This is Takeo Tsujii@Tsujii Planning Office. ▼ |

Takeo@Jiro's drinking buddy.
This is Takeo@Kanagawa Central Tennis Club.

◎ Create Needs Content
Please enter the text of your needs message.

| Our office is urgently seeking an individual (experienced) who can redraft architectural drawings. Period is one month, from 8/22-9/22. Excellent pay and working conditions since contract is limited-term. Those wishing to apply, please contact me. |

◎ Set Feedback Options for Distributee User
                    Add/Update/Delete Feedback Options ☑ I wish to apply.
☑ I do not wish to apply.
☑ Will introduce someone who fits.
☐ Will join.
☐ Will not join.

[Set]   [Cancel]

*Fig. 9A*

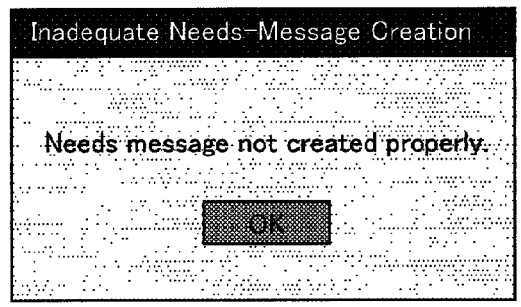

*Fig. 9B*

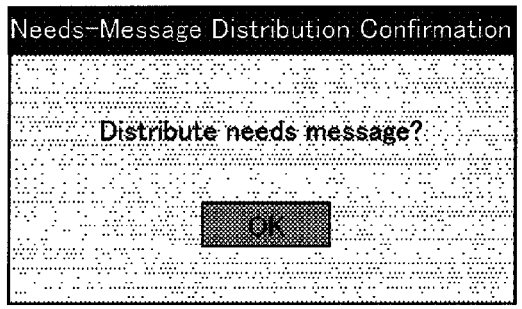

*Fig. 14*

```
Instant Message Service:  Configuring Needs-Message Receiving Preferences
http://www.instantmessage/needsmessage/create.html! UID=2000000034&MID=1
```

● Configuring Needs-Message Receiving Preferences
  ○ Do not receive needs messages at all.
  ◎ Receive needs messages depending on preferences.
   ☑ As a rule, receive all needs messages if authorized by
      a confirmation message.
   Receive unconditionally needs messages that are from
   the users noted below.
      Work Colleagues
         ☐ Ichiro Yamada
         ☐ Jun Takayama
         ☑ Hitomi Tamai
         ☐ Yoichi Nakata
      Pals
         ☑ Ichiro Yamada
         ☑ Ki'ichi Yasumoto
      Tennis Circle
         ☐ Yuko Hotari
         ☑ Taro Sakurai
         ☐ Yumi Ishino
   ☐ Receive only from buddy lists having similar names.
   ☑ Receive only when I am on-line.

*Fig. 15*

INFORMATION DISTRIBUTION METHOD AND DEVICE

BACKGROUND OF THE INVENTION

1. Technical Field

The present invention relates to technology by which fellow users on a network transmit and receive messages.

2. Description of Related Art

Instant messaging systems are offered as systems that let users converse on networks in real time, or that let information flow among users. The buddy-list system may be cited as one example of an instant messaging system. The buddy-list system is composed of a buddy server that administrates user status information, and a plurality of buddy clients, connected via a network.

Using a buddy client a, a user A registers on a buddy server information pertaining to his or her status. A disclosure level for the registered status information can be combined in making this configuration. Furthermore, user A registers other users or another user group whose status information he or she would like to look up. The users here are called "buddies"; the user group, a "buddy list."

The buddy server stores user A status information and disclosure level that has been reported from buddy client a, assigning them correspondences to user A. Likewise, based on a buddy list that has been reported from buddy client a, that user A would like status information on users B, C, D . . . registered on the buddy list to be broadcast is stored. When status information on user A is received, the buddy server stores it in a correspondence assigned to user A. In addition, the buddy server reports, in accordance with the disclosure level set by user A, updated status information to broadcast destinations for status information on user A.

Meanwhile, buddy client a updates display of status information on users B, C, D . . . If buddy client a is not in running, the moment it is launched it acquires from the buddy server and displays the most recent status information on users B, C, D . . .

In short, with a buddy-list system, by registering one's status, and, as buddies, users in whom one is interested, the buddy client displays buddy status in a list on a user terminal. Furthermore, if buddy status information that is looked up has changed, the status information displayed on the user terminal is automatically updated. Connecting to a buddy server and registering a buddy list enables a user readily to look up the status of users about whom he or she is concerned.

User status is expressed by means of objects such as status icons or text messages are provided through buddy-list system providers and are downloaded to each user's terminal to suit needs.

Buddy lists and disclosure levels configured by the users in buddy list systems as just described indicate, as it were, information-exchange relationships among users, or in other words, connections in human relationships. If information-exchange relationships among users were effectively utilized, it would be possible to realize new information-distribution methods that cannot be realized with existing buddy list systems. Information-exchange relationships are set up even in instant messaging systems other than buddy list systems. Nevertheless, an information distribution method for instant messaging systems that takes advantage of information-exchange relationships as yet has not been offered.

SUMMARY OF THE INVENTION

An object of the present invention is to take advantage of information-exchange relationships set up in instant messaging systems. Likewise, an object of the present invention is to provide a method utilizing the aforementioned information-exchange relationships for information distribution among users on a network.

The invention in a first aspect is an information-distribution method utilized by a computer connected to user terminals via a network, the information-distribution method including: a designation-accepting step of accepting from any of the user terminals, being a designator, designation of at least any other among the user terminals; a storing step of storing at least one designator-user identifier identifying any user terminal that is a designator in the designation-accepting step, correlatively with a designee-user identifier identifying the at least one other user terminal designated in the designation-accepting step; an information-accepting step of accepting, from a first user terminal being a distributor among the user terminals, informational content to be distributed; a distribution-condition-accepting step of accepting from the distributor-user terminal a distribution condition according to which the distribution content accepted in the information-accepting step is distributed; a distributee-candidate-determining step of determining one or more distributee-candidate terminals to which the distribution content will be distributed, the distributee-candidate terminals being at least one selected, in accordance with the distribution condition, from second user terminals among the designee-user terminals stored, in the storing step, correlatively with the designator-user identifier identifying the distributor-user terminal; a first distribution step of transmitting the distribution content accepted in the information-accepting step to the one or more distributee-candidate terminals; a second distribution step of transmitting the distribution content, from any user terminal to which the distribution content has been sent, to some or all of one or more third user terminals among the designee-user terminals correlated in the storing step with one or more designator-user identifiers identifying as designator users user terminals to which the distribution content has been sent; and a distribution-catenating step of repeating the second distribution step.

This method distributes information in concatenate fashion: from a user to that user's buddies, and further from buddies and again to those buddies. Distributees are at minimum included in the distribution conditions. The distribution conditions may include, in addition to distributee, stop conditions, fulfillment conditions, and responses upon fulfillment. Herein, "distributees" are user terminals to which information is distributed. A "fulfillment condition," wherein distribution content expresses a distributing party's request, means a judgment criterion by which it is decided whether or not the request has been satisfied. "Responses upon fulfillment" means responses to distributor and distributee when the aforementioned request is met.

A second aspect of the invention is the information-distribution method as set forth in the foregoing first aspect, wherein the distribution-condition-accepting step includes receiving from the first user terminal selection of the at least one distributee-candidate terminal.

A first-user operating the first user terminal may select second user terminals, i.e., the above-noted distributee-candidate terminals from among his or her own buddies.

The invention in a third aspect is the information-distribution method as set forth in the foregoing first aspect, wherein the distribution-condition-accepting step includes receiving a stop condition for stopping the distribution-catenating step.

To give examples of stop conditions, maximum distributing-user count, distributee-user status, and expiration date may be cited. Providing the stop condition prevents distribution of the distribution content from catenating endlessly.

A fourth aspect is the information-distribution method set forth in the aforementioned third aspect, wherein the stoppage-receiving step includes: recording stop-condition candidates that are alternatives for the stop condition; and accepting selection of at least one of the stop-condition candidates.

Examples that can be given of stop-condition candidates are: 1) count of users distributing distribution content; 2) restriction as to relational proximity to a first-user; 3) status of distributee user terminals; and 4) expiration date.

In a fifth aspect, the invention is the information-distribution method set forth in the aforementioned third aspect, wherein the stoppage-receiving step includes: recording stop-condition candidates that are alternatives for the stop condition; and accepting selection of at least one of the stop-condition candidates; wherein the stop-condition candidates include a maximum count of user-terminals that distribute the distribution content.

A user-count restriction is utilized as one stop-condition candidate.

A sixth aspect is the information-distribution method set forth in the foregoing third aspect, wherein the distribution-condition-accepting step further includes: recording stop-condition candidates that are alternatives for the stop condition; and accepting selection of at least one of the stop-condition candidates; wherein the stop-condition candidates include a depth-level restriction indicating path length between the first user terminal and user terminals to which the distribution content is distributed.

For example, setting the first user terminal to be depth-level 0 puts the user terminal(s) that directly receive the distribution content from the first user terminal at depth-level 1, and the user terminal(s) that receive the distribution content from the depth-level 1 user terminal(s) is 2, . . . and so on likewise, whereby the depth levels may be restricted.

In a seventh aspect, the invention is the information-distribution method set forth in the aforementioned third aspect, further including: a status-receiving step of receiving, from reporter-user terminals among the user terminals, status reports on the users; and a status-storing step of storing the statuses received in the status-receiving step correlatively with user identifiers identifying the reporter-user terminals; wherein the distribution-condition-accepting step includes recording stop-condition candidates that are alternatives for the stop condition, and accepting selection of at least one of the stop-condition candidates; the stop-condition candidates therein including a restriction per the status, recorded in the status-storing step, of users distributing the distribution content.

Utilized as single stop conditions, for example, are: whether or not a user terminal distributing distribution content is connected to the network; at-desk status such as in/out/ whereabouts; and user-configured message content saying "I'm feeling fine today."

An eighth aspect is the information-distribution method set forth in the foregoing third aspect, wherein the distribution-condition-accepting step includes: recording stop-condition candidates that are alternatives for the stop condition; and accepting selection of at least one of the stop-condition candidates; wherein the stop-condition candidates include an expiration date for distributing the distribution content.

Providing an expiration date prevents distribution of the distribution content from continuing endlessly.

A ninth aspect of the invention is the information-distribution method as set forth in the foregoing first aspect, wherein: the distribution content contains a request by the user operating the first user terminal; and the distribution-condition-accepting step includes accepting a fulfillment condition that serves as a judgment criterion for judging whether or not the request has been met.

The distribution content conceivably might be, for example, the text message "Seeking a programmer who can handle C++." In this case the fulfillment condition may be set to be three replies "Will introduce a programmer" answered back.

A tenth aspect is the information-distribution method as set forth in the just-noted ninth aspect, wherein the distribution-condition-accepting step further includes: a fulfillment-storing ancillary step of storing fulfillment-condition candidates that are alternatives for the fulfillment conditions; and a fulfillment-selecting ancillary step of accepting selection of at least one of the fulfillment-condition candidates.

For example, 1) when three persons have replied "I wish to apply."; and 2) when four persons have replied "Will introduce someone who fits." are stored as fulfillment-condition candidates. A combination of one or more of these fulfillment-condition candidates determines the fulfillment condition(s).

The invention in an eleventh aspect is the information-distribution method as set forth in the foregoing first aspect, wherein: the distribution content contains a request by the user operating the first user terminal; and the distribution-condition-accepting step includes accepting a fulfillment condition that serves as a judgment criterion for judging whether or not the request has been met, and accepting a response to, if the fulfillment condition has been met, user terminals to which the distribution content has been distributed and/or the first user terminal.

Distributing the text message "We have found the programmer we had sought. Thank you for your cooperation." may be cited as one example of a response to the distributees. Likewise, reporting the distributees who have made replies that meet the fulfillment condition(s) may be cited as a response to the distributor.

A twelfth aspect is the information-distribution method as set forth in the just-noted eleventh aspect, wherein the distribution-condition-accepting step further includes: storing response candidates that are alternatives for the responses; and accepting selection of at least one of the response candidates.

The response candidates may be stored beforehand, whereby accepting selection from the first-user, the response to the first-user and the distributees may be determined.

In a thirteenth aspect, the invention is the information-distribution method as set forth in the above-noted eleventh aspect, wherein the distribution-condition-accepting step further includes: storing response candidates that are alternatives for the responses, and accepting selection of at least one of the response candidates; wherein the response candidates include a response reporting, to user terminals to which the distribution content has been distributed and/or the first user terminal, that the fulfillment condition has been satisfied.

A response reporting, to the distributee-user terminals and a first user terminal that is a distributor, that a request has been satisfied may be stored in advance as one of the response candidates.

A fourteenth aspect is the information-distribution method as set forth in the eleventh aspect noted above, wherein the distribution-condition-accepting step further includes: storing response candidates that are alternatives for the responses, and accepting selection of at least one of the response candidates; wherein the response candidates include a response reporting to the first user terminal user identifiers identifying user terminals that have contributed to satisfying the fulfillment condition.

A response reporting to the first user terminal users who have made the reply "Will introduce someone who fits." for example is stored ahead as one of the response candidates.

In a fifteenth aspect, the invention is the information-distribution method as set forth in the foregoing eleventh aspect, wherein the distribution-condition-accepting step further includes: storing response candidates that are alternatives for the responses, and accepting selection of at least one of the response candidates; wherein the response candidates include a response reporting, to user terminals to which the distribution content has been distributed and/or the first user terminal, the distribution content the fulfillment condition for which has been satisfied.

A sixteenth aspect of the invention is the information-distribution method as set forth in the foregoing eleventh aspect, further including: a response-receiving step of receiving a response from a user terminal to which the distribution content has been distributed; a judgment step of judging, based on the response received in the response-receiving step, whether or not the fulfillment condition has been satisfied; and a response-execution step, if the fulfillment condition has been satisfied, of executing the response, received in the response-receiving step, to the user terminals to which the distribution content has been distributed and/or the first user terminal.

For example, a test message indicating that the first-user's request has been met is transmitted the distributee and first user terminals.

The invention in a seventeenth aspect is the information-distribution method as set forth in the foregoing first aspect, further including: a receiving-conditions step of receiving, from setter-user terminals among the user terminals, settings as to receiving conditions that serve as criteria for judging whether or not to receive the distribution content transmitted through the first distribution step or the second distribution step; a receiving-conditions storing step of storing the receiving conditions correlatively with user identifiers identifying the setter-user terminals; a reception-satisfying step of judging, prior to executing the first distribution step or the second distribution step, whether or not the receiving conditions per the distributee-candidate terminals or the third user terminals are satisfied; and a transmission-regulating step of, in accordance with the judgment results from the reception-satisfying step, executing or terminating execution of the first distribution step or the second distribution step.

Distribution is executed only if the receiving conditions on the end that receives the distribution content are met.

An eighteenth aspect is the information-distribution method as set forth in the foregoing first aspect, further including: a forwarding-conditions step of receiving, from setter-user terminals among the user terminals, settings as to forwarding conditions that serve as criteria for judging whether or not to transmit to some or all of the third user terminals the distribution content transmitted through the second distribution step; a forwarding-conditions storing step of storing the forwarding conditions correlatively with user identifiers identifying the setter-user terminals; a forwarding-satisfying step of judging, prior to executing the second distribution step, whether or not the forwarding conditions per the user terminals to which the distribution content has been distributed are satisfied; and a forwarding-regulating step of, in accordance with the judgment results from the forwarding-satisfying step, executing or terminating execution of the second distribution step.

Distribution is executed only if the forwarding conditions on the end that transmits the received distribution content are met.

The invention in a nineteenth aspect is the information-distribution method as set forth in the foregoing first aspect, wherein in the second distribution step a judgment is made as to whether or not the third user terminals include any user terminals to which the distribution content has already been transmitted, and the distribution content is transmitted to some or all of the third user terminals apart from any user terminals to which the distribution content has already been transmitted.

This prevents duplicate transmission of the same distribution content.

A twentieth aspect is the information-distribution method as set forth in the foregoing first aspect, further including: an incentive-storing step of storing incentive criteria for determining incentives offered to user terminals having received and/or transmitted the distribution content; and an incentive-offering step of offering, to the user terminals having received and/or transmitted the distribution content, incentives in accordance with the incentive criteria.

In a twenty-first aspect, the invention is the information-distribution method as set forth in the foregoing first aspect, wherein: the storing step includes, when storing the user identifier identifying the designator-user terminal, correlatively with the at least one designee user identifier, grouping the designee user identifiers, if more than one, and storing them group-by-group correlatively with group names; the distribution-condition-accepting step accepts, as a distribution condition, identicalness or similarity between associations of the group names; and the distributee-candidate-determining step includes judging whether or not a group name stored correlatively with a first-order user identifier is identical with or similar to a group name designated by the distribution condition, and determining a user terminal stored correlatively with a group name judged to be an identical or similar user terminal to be a candidate terminal to which the distribution content is distributed.

The invention in a twenty-second aspect is an information-distribution device connected to user terminals via a network, the information-distribution device comprising: a designation-accepting means for accepting from any of the user terminals, being a designator, designation of at least any other among the user terminals; a storing means for storing at least one designator-user identifier identifying any user terminal that is a designator by the designation-accepting means, correlatively with a designee-user identifier identifying the at least one other user terminal designated by the designation-accepting means; an information-accepting means for accepting, from a first user terminal being a distributor among the user terminals, informational content to be distributed; a distribution-condition-accepting means for accepting from the distributor-user terminal a distribution condition according to which the distribution content accepted by the information-accepting means is distributed; a distributee-candidate-determining means for determining one or more distributee-candidate terminals to which the distribution content will be distributed, the distributee-candidate terminals being at least one selected, in accordance with the distribution condition, from second user terminals among the designee-user terminals stored, by the storing means, correlatively with the designator-user identifier identifying the distributor-user terminal; a first distribution means for transmitting the distribution content accepted by the information-accepting means to the one or more distributee-candidate terminals; a second distribution means for transmitting the distribution content, from any user terminal to which the distribution content has been sent, to some or all of one or more third user terminals among the designee-user terminals correlated by the storing means with one or more designator-user identifiers identifying as designator users user terminals to which the distribution content has been sent; and a distribution-catenating means for iteratively activating the second distribution means.

In a twenty-third aspect, the invention is a computer-readable recording medium on which is recorded a information-distribution program utilized by a computer connected to user terminals via a network, the computer-readable recording medium on which is recorded a information-distribution program for executing: a designation-accepting step of accepting from any of the user terminals, being a designator, designation of at least any other among the user terminals; a storing step of storing at least one designator-user identifier identifying any user terminal that is a designator in the designation-accepting step, correlatively with a designee-user identifier identifying the at least one other user terminal designated in the designation-accepting step; an information-accepting step of accepting, from a first user terminal being a distributor among the user terminals, informational content to be distributed; a distribution-condition-accepting step of accepting from the distributor-user terminal a distribution condition according to which the distribution content accepted in the information-accepting step is distributed; a distributee-candidate-determining step of determining one or more distributee-candidate terminals to which the distribution content will be distributed, the distributee-candidate terminals being at least one selected, in accordance with the distribution condition, from second user terminals among the designee-user terminals stored, in the storing step, correlatively with the designator-user identifier identifying the distributor-user terminal; a first distribution step of transmitting the distribution content accepted in the information-accepting step to the one or more distributee-candidate terminals; a second distribution step of transmitting the distribution content, from any user terminal to which the distribution content has been sent, to some or all of one or more third user terminals among the designee-user terminals correlated in the storing step with one or more designator-user identifiers identifying as designator users user terminals to which the distribution content has been sent; and a distribution-catenating step of repeating the second distribution step.

In a twenty-fourth aspect, the invention is a computer product utilized by a computer connected to user terminals via a network, the information-distribution product for making the computer function as: a designation-accepting means for accepting from any of the user terminals, being a designator, designation of at least any other among the user terminals; a storing means for storing at least one designator-user identifier identifying any user terminal that is a designator by said designation-accepting means, correlatively with a designee-user identifier identifying the at least one other user terminal designated by said designation-accepting means; an information-accepting means for accepting, from a first user terminal being a distributor among the user terminals, informational content to be distributed; a distribution-condition-accepting means for accepting from the distributor-user terminal a distribution condition according to which the distribution content accepted by said information-accepting means is distributed; a distributee-candidate-determining means for determining one or more distributee-candidate terminals to which the distribution content will be distributed, the distributee-candidate terminals being at least one selected, in accordance with the distribution condition, from second user terminals among the designee-user terminals stored, by said storing means, correlatively with the designator-user identifier identifying the distributor-user terminal; a first distribution means for transmitting the distribution content accepted by said information-accepting means to the one or more distributee-candidate terminals; a second distribution means for transmitting the distribution content, from any user terminal to which the distribution content has been sent, to some or all of one or more third user terminals among the designee-user terminals correlated by said storing means with one or more designator-user identifiers identifying as designator users user terminals to which the distribution content has been sent; and a distribution-catenating means for iteratively activating said second distribution means.

The invention in a twenty-fifth aspect is an information-distribution method utilized by an information-exchange server able to communicate with a plurality of user terminals via a network, the information-distribution method: accepting, user-by-user in advance, registration of other users whom a given user desires will consult information, and storing, as information-exchange relationship data, identifier-information for the given user, correlatively with the other users of whom it is desired will consult information; accepting, user-by-user, registration of first information pertaining to the given user, and, based on the information-exchange relationship data, reporting or disclosing the first information to users having an information-exchange relationship to the given user; and accepting, user-by-user, registration of second information containing distribution conditions, picking out, as a starting point, users included in the distribution conditions who will be first distributees and, as distributees for the second information, users who, based on the information-exchange relationship data, fit the distribution conditions, and transmitting the second information to the users picked out.

The invention in a twenty-sixth aspect is an information-broadcast method utilized by a first computer connected with a group of other computers through a network, the information-broadcast method including: a designation step of accepting from a first user operating the first computer designation of one or more second computers included in the computer group; an information-input step of accepting from the first user input of information to be distributed; and a conditions-input step of accepting from the first user input of distribution conditions for distributing the distribution information accepted in said input step.

This method utilizes the first user terminals set forth in the foregoing first aspect of the present invention.

The invention in a twenty-seventh aspect is an information-reception method utilized by a second computer connected through a network to the first computer as set forth in the aforementioned twenty-sixth aspect of the invention, the information-reception method: accepting, from a second user operating the second computer, input of reception conditions that serve as judgment criteria for judging whether or not to receive the distribution information that the first computer distributes.

In an twenty-eighth aspect, the invention is an information-reception method utilized by a second computer connected through a network to a group of computers including the first computer as set forth in the aforementioned twenty-sixth aspect of the invention, the information-reception method including: a designation step of accepting from a second user operating the second computer designation of one or more third computers included in the computer group; an acceptance step of accepting, from the second user, input of forwarding conditions that serve as judgment criteria for judging whether or not to transmit to some or all of the third computers the distribution information that the first computer distributes.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 9A is a needs-message creation screen example;

FIG. 9B is an error-message display example;

FIG. 14 is a distribution confirmation screen example;

FIG. 15 is an example of a screen for configuring needs-message receiving preferences;

FIGS. 18A and 18B are examples of display when a need is fulfilled, wherein:

18A is a (distributee) display example of a need-fulfillment-notification message, and

Figure 19A:
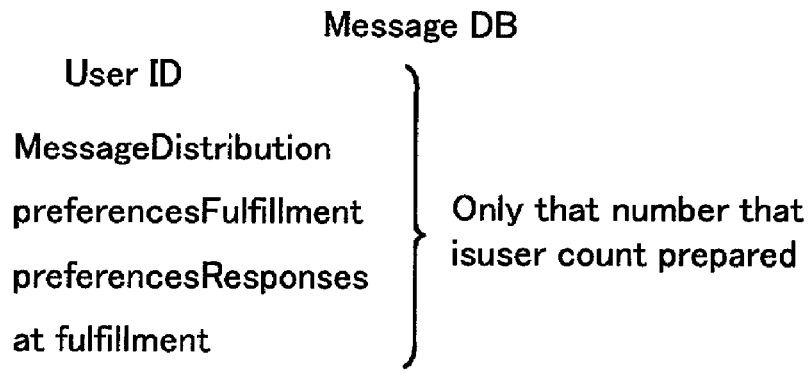
Figure 19B:
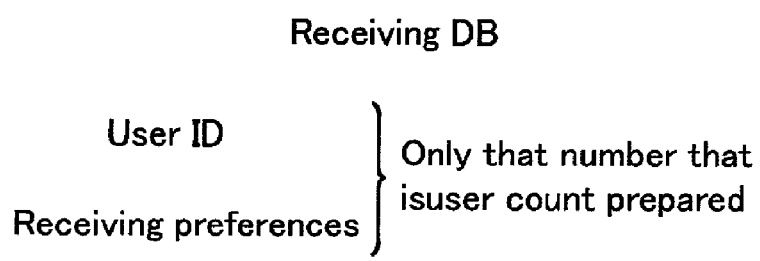
Figure 19C:
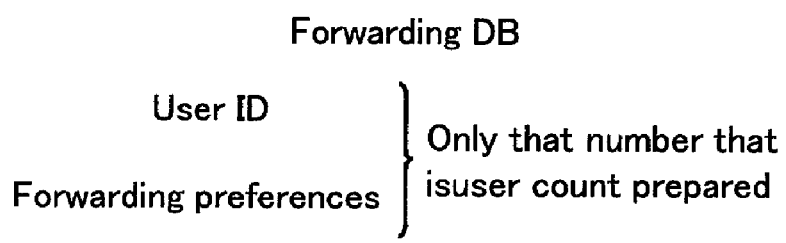
Figure 20:
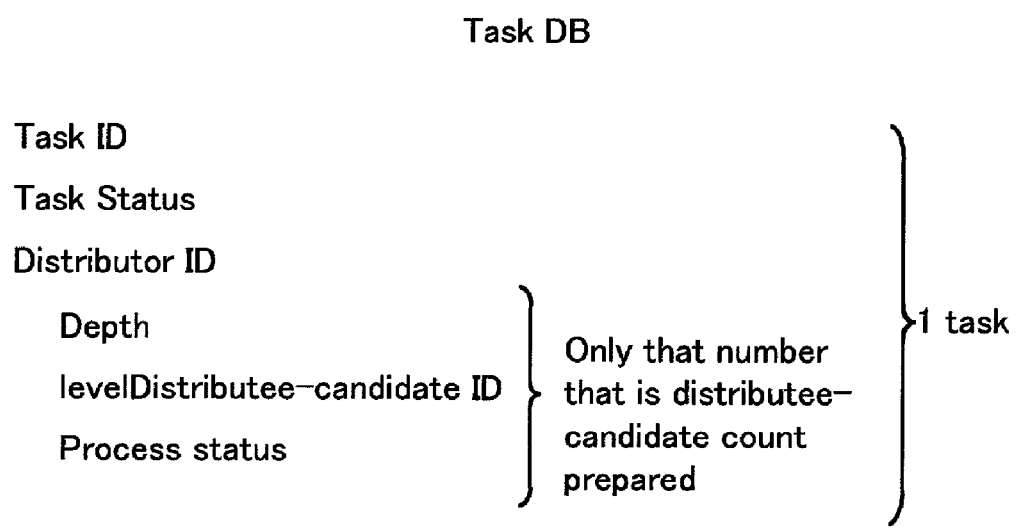
Figure 21:
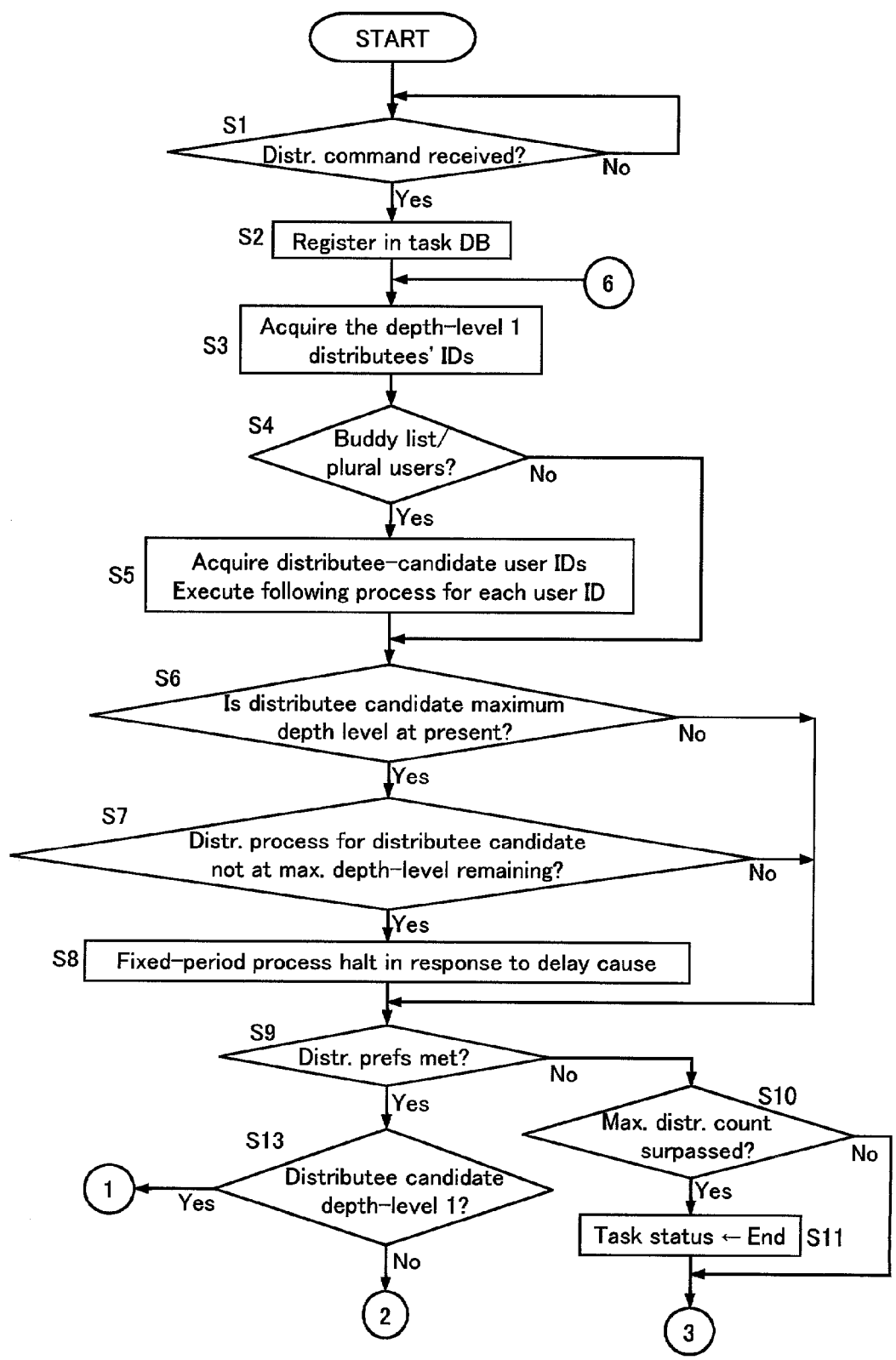
Figure 22:
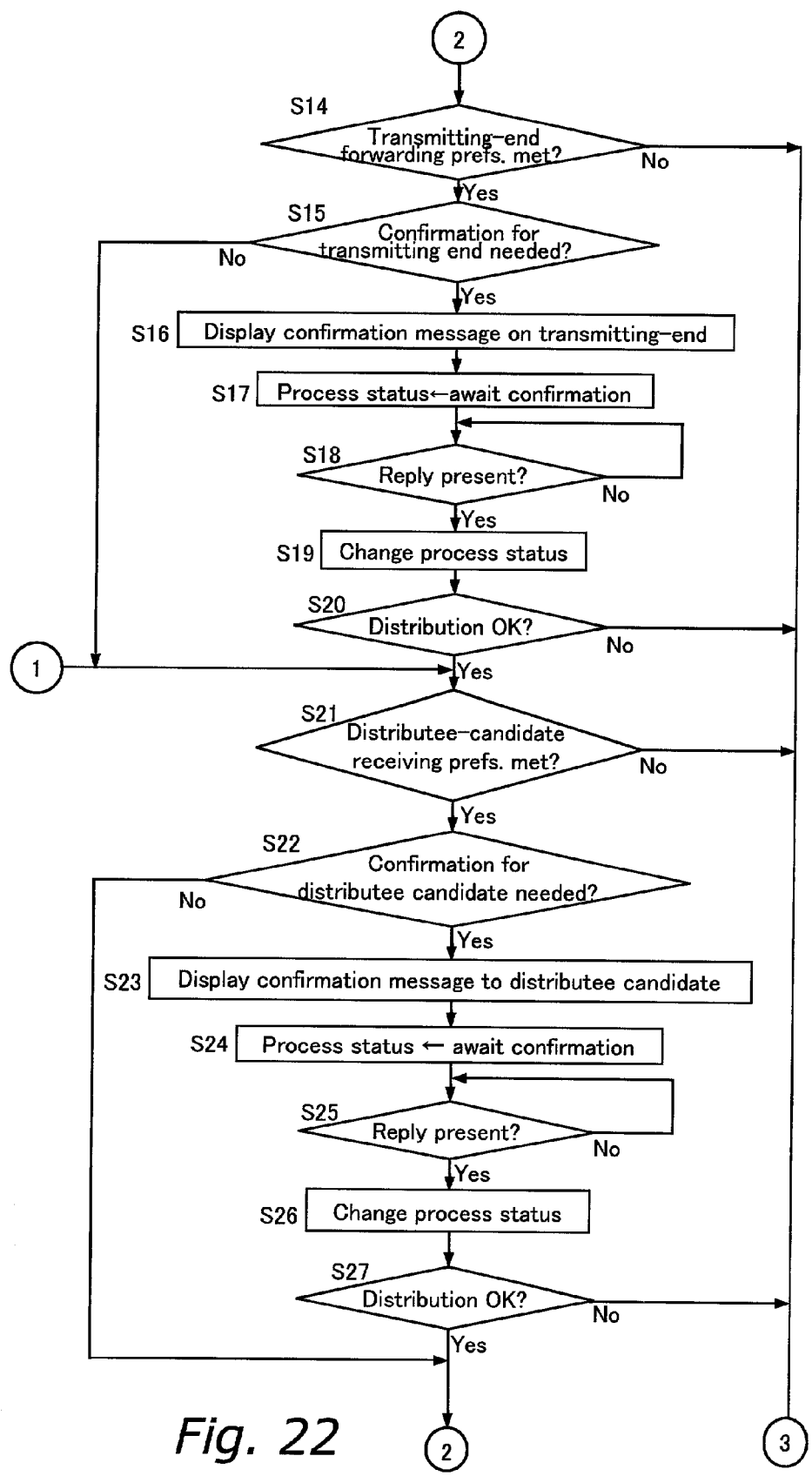
Figure 23:
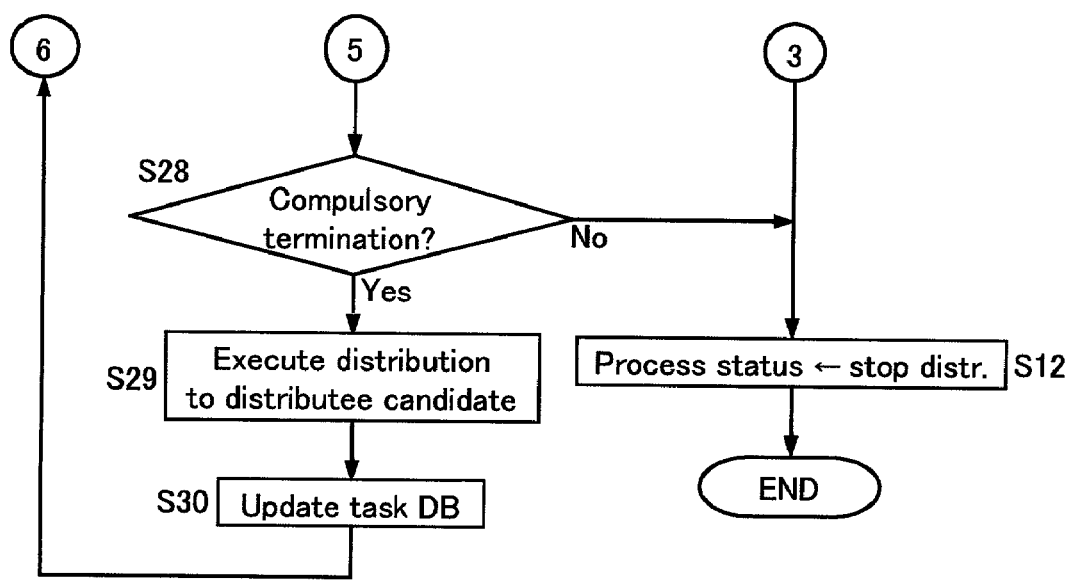
Figure 24:
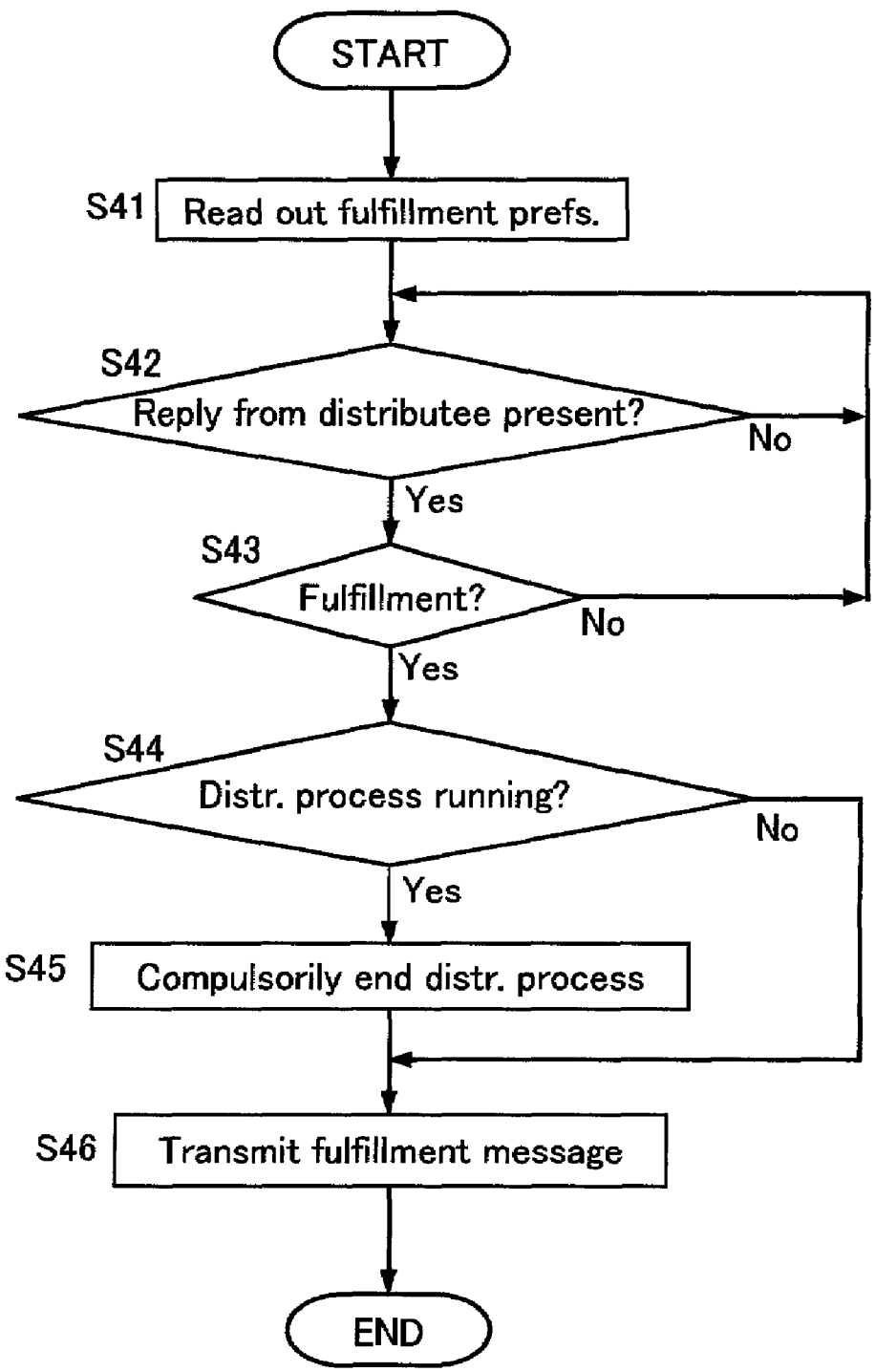
Figure 25:
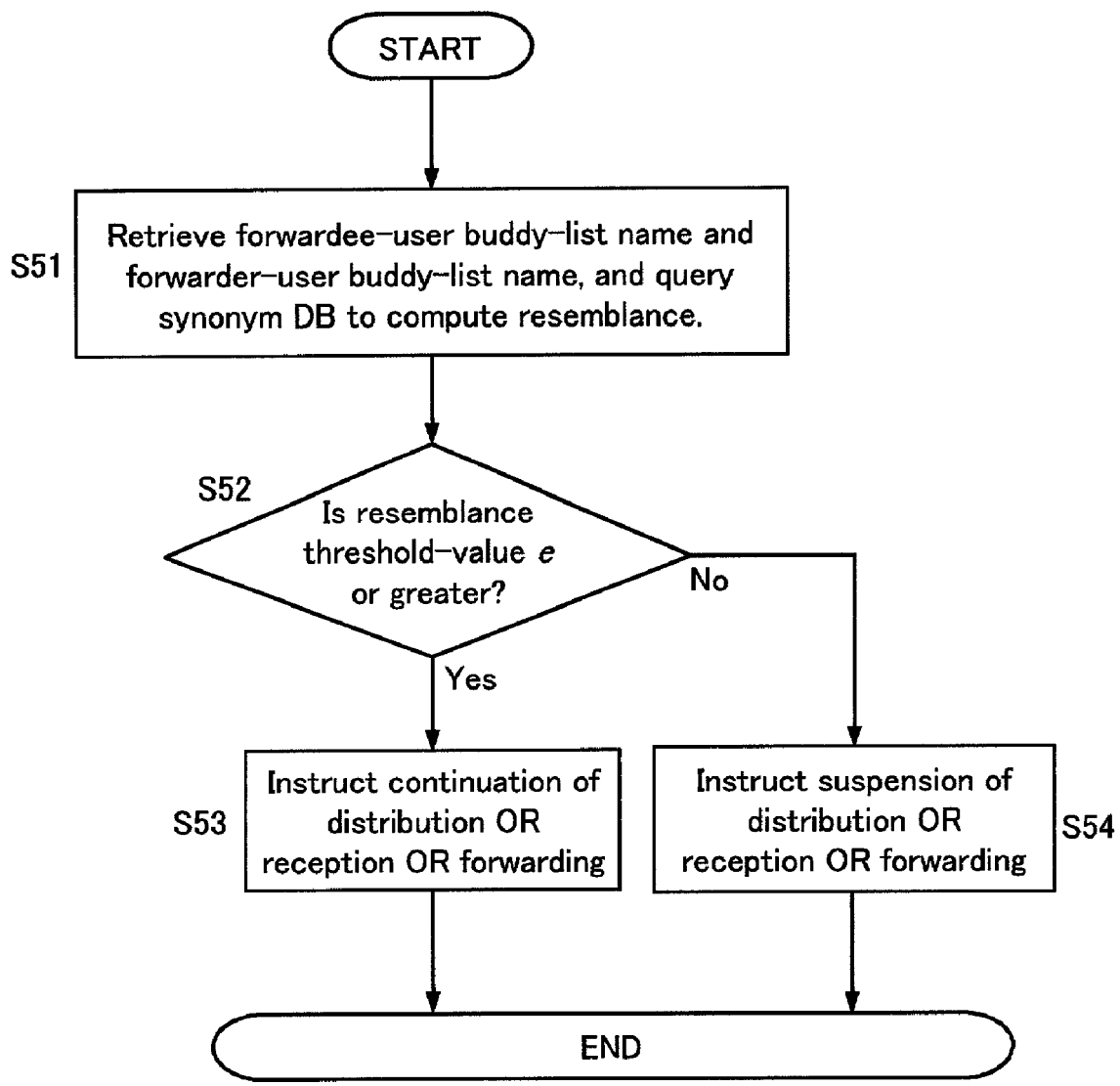

18B is a display example at distributor;

FIG. 19A is an explanatory diagram of the structure of data stored in a message DB;

FIG. 19B is an explanatory diagram of the structure of data stored in a receiving DB;

FIG. 19C is an explanatory diagram of the structure of data stored in a forwarding DB;

FIG. 20 is an explanatory diagram of the structure of data stored in a task DB;

FIG. 21 is a flowchart (1) illustrating the flow of a distribution-routine;

FIG. 22 is a flowchart (2) illustrating the flow of a distribution-routine;

FIG. 23 is a flowchart (3) illustrating the flow of a distribution-routine;

FIG. 24 is a flowchart (1) illustrating the flow of a fulfillment-routine; and FIG. 25 is a flowchart illustrating the flow of a routine for judging whether or not buddy-list names are similar.

DETAILED DESCRIPTION OF THE PREFERRED EMBODIMENTS

First Embodiment Example (1) Configurations

Figure 1:
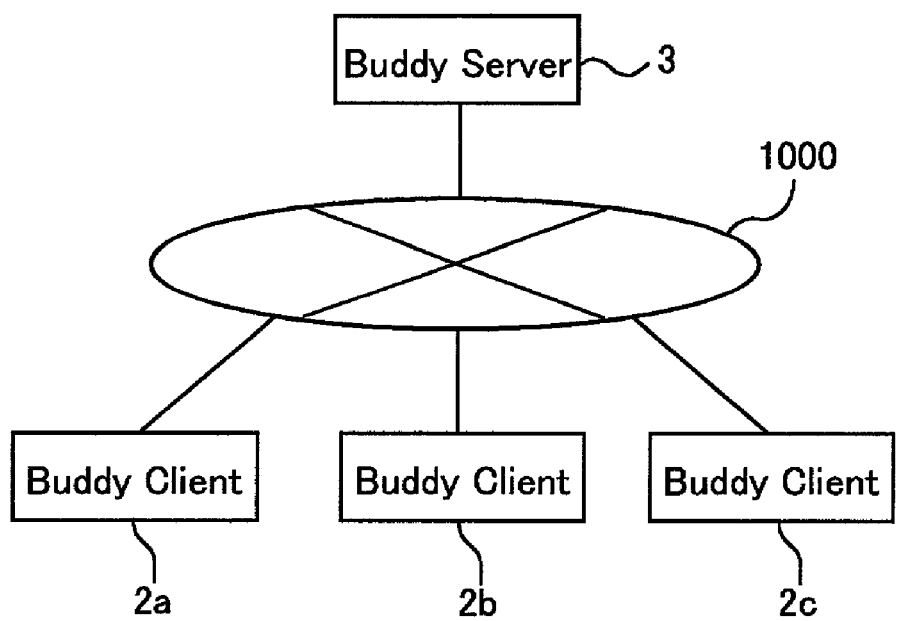
FIG. 1 is an overall configuration of a messaging system having to do with a first embodiment example.

FIG. 1 is an explanatory diagram illustrating the overall configuration of a messaging system having to do with a first embodiment example. The messaging system that relates to the first embodiment example is configured utilizing a buddy list system. Specifically, the system is composed by connecting a buddy server 3, and buddy clients 2a, 2b, 2c through a network 1000 such as the Internet. The users handle each buddy client 2a-2c ("buddy client 2" hereinafter) may transmit and receive to one another via the buddy server 3 objects such as text messages and status icons. In the following, in order to facilitate explanation a case in which text messages are used as objects will be taken as an example to illustrate. Text messages divide grossly into IM (instant messages) and needs messages. Herein, an IM is employed in order: 1) for a user to report his or her present status to other users who are registered on a buddy list on which the user him/herself is buddy; 2) for a user to summon other users; or 3) for a user to reply to messages received from other users. Likewise, needs messages are used in order for a user make notification of his or her own requests.

Figure 2:
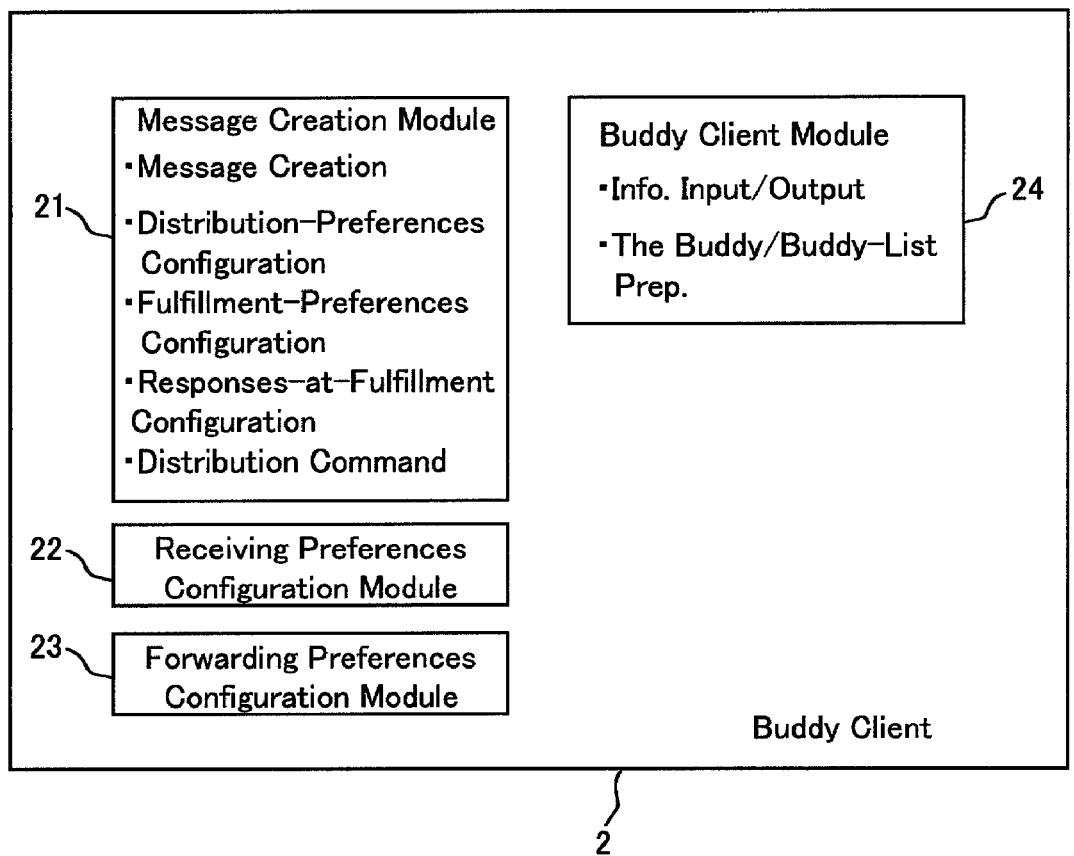
FIG. 2 is a block diagram illustrating the functional configuration of a buddy client.

FIG. 2 is a block diagram illustrating the functional configuration of the buddy client 2. The buddy client 2 includes a message creation module 21, a receiving-preferences configuration module 22, a forwarding-preferences configuration module 23, and a buddy client module 24. These are programs executed by the CPU in the computer in which the buddy client 2 is run. These programs may be stored on a hard disk or the like in the aforementioned computer, or may be downloaded from an ASP (application service provider), not shown in the figures.

The message creation module 21 has the following principal functions.

1) Message Creation Function: accepts and transmits to the buddy server 3 the creation of needs messages.

2) Distribution-Preferences Configuration Function: accepts and transmits to the buddy server 3 settings on distribution preferences for distributing needs messages.

3) Fulfillment-Preferences Configuration Function: accepts and transmits to the buddy server 3 settings on fulfillment preferences, which becomes a judgment criterion for judging whether or not requests that needs messages convey (which requests are referred to simply as "needs" hereinafter) have been met.

4) Responses-at-Fulfillment Configuration Function: wherein a need has been met, accepts and transmits to the buddy server 3 settings for responses to the buddy client of the user who created the needs message (which buddy client is called "distributor" hereinafter) and to the buddy client through which the needs message was distributed (which buddy client is called "distributee" hereinafter). Considered to be responses in the present embodiment example are instances in which messages for a distributes (which messages are called "fulfillment-notification messages" hereinafter), and in which notification to a distributor from a buddy server, are transmitted.

5) Distribution Command Function: commands to the buddy server 3 distribution of needs messages.

The receiving-preferences configuration module 22 accepts and transmits to the buddy server 3 a setting on receiving preferences, which becomes the criterion for judging whether or not to receive a needs message.

The forwarding-preferences configuration module 23 accepts and transmits to the buddy server 3 a setting on forwarding preferences, which becomes the criterion for judging whether or not to transmit (referred to simply as "forward" hereinafter) a needs message received from a certain buddy client 2 to a different buddy client 2.

The buddy client module 24 includes the functions of the previously described buddy clients. The functions divide grossly into an information input/output function, and a buddy/buddy-list preparation function. The information input/output function works to input and output aforementioned IMs that are status information. The buddy/buddy-list preparation function works to accept input of buddies and buddy lists, and register them on the buddy server 3.

Figure 3:
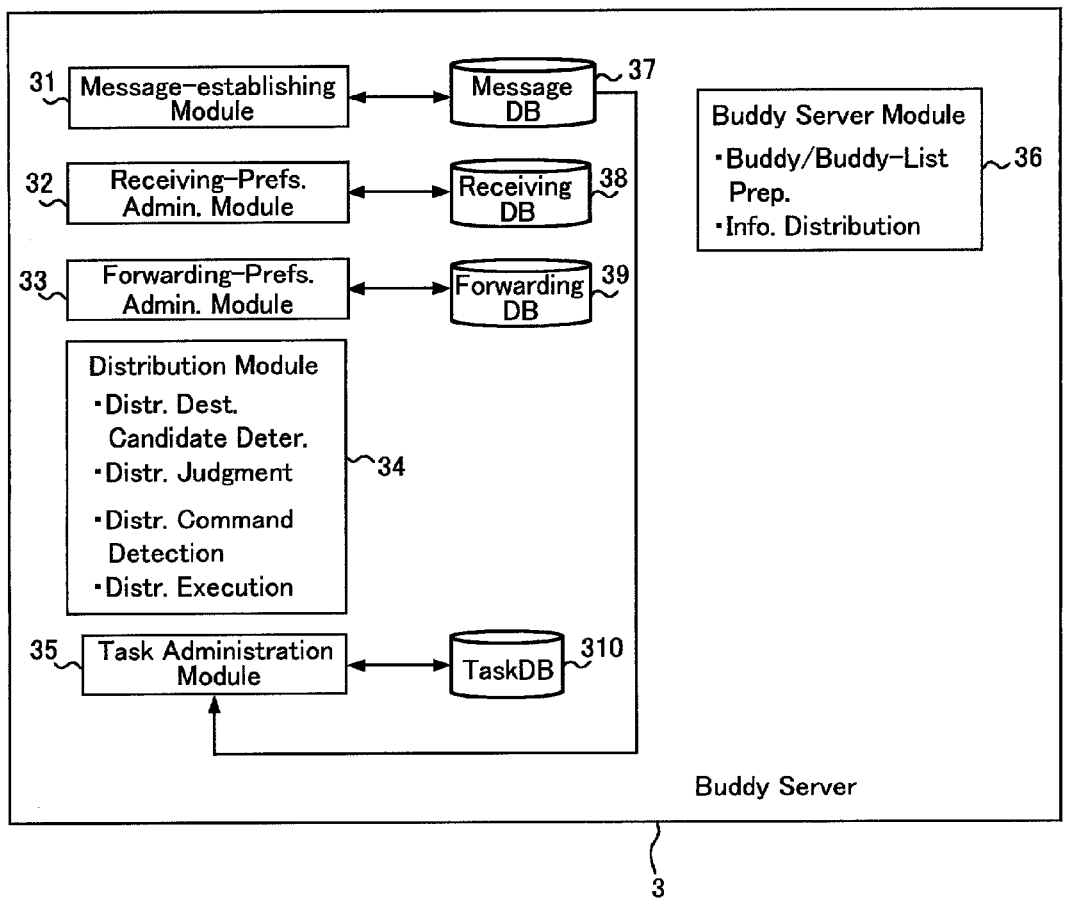
FIG. 3 is a block diagram illustrating the functional configuration of a buddy server.

FIG. 3 is a block diagram illustrating the functional configuration of the buddy server 3. The buddy server 3 includes six programs for: a message-establishing module 31, a receiving-preferences administration module 32, a forwarding-preferences administration module 33, a distribution module 34, a task administration module 35, and a buddy server module 36. These programs are executed on the CPU in the computer on which the buddy server 3 operates. Likewise, the buddy server 3 includes four databases: a message database (DB) 37, a receiving DB 38, a forwarding DB 39 and a task DB 310. These databases may be saved on the hard disk in the aforementioned computer, or may be saved on the hard disk in a separate computer. The data stored in these databases will be described later.

The message-establishing module 31 registers in the message DB 37 needs messages, distribution preferences, fulfillment preferences, and response transmitted from the buddy client 2, together with a user ID that identifies the transmitting source.

The receiving-preferences administration module 32 registers in the receiving DB 38 receiving preferences transmitted from the buddy client 2, together with the user ID that identifies the transmitting source.

The forwarding-preferences administration module 33 registers in the forwarding DB 39 forwarding preferences transmitted from the buddy client 2, together with the user ID that identifies the transmitting source.

The distribution module 34 has the following principal functions.

1) Distributee Candidate Determination Function: determines distributee candidates based on buddies and buddy lists in the buddy client 2.
2) Distribution Judgment Function: determines whether or not to distribute a needs message to a distributee candidate, based on distribution preferences for the distributor, and receiving and forwarding preferences for the distributee candidate.
3) Distribution Command Detection Function: detects distribution commands transmitted from the buddy client 2 together with the user ID.
4) Distribution Execution Function: based on judgment results of the distribution judgment function, executes transmission of needs messages to the distributes candidate.

Task administration module 35: administrates as a single task a distribution process that transmits a single given needs message serially to a plurality of distributes candidates.

The buddy server module 36 chiefly includes a buddy/buddy-list administration function and an information distribution function. The buddy/buddy-list administration function stores buddies and buddy lists transmitted from the buddy client 2, assigning them correspondences with a user ID that identifies the buddy client 2. The information distribution function transmits an IM, transmitted from a buddy client 2, to a different buddy client 2. The transmission destination for the IM is determined based on the buddies and buddy lists.

(2) Overview of Invention

Figure 4:
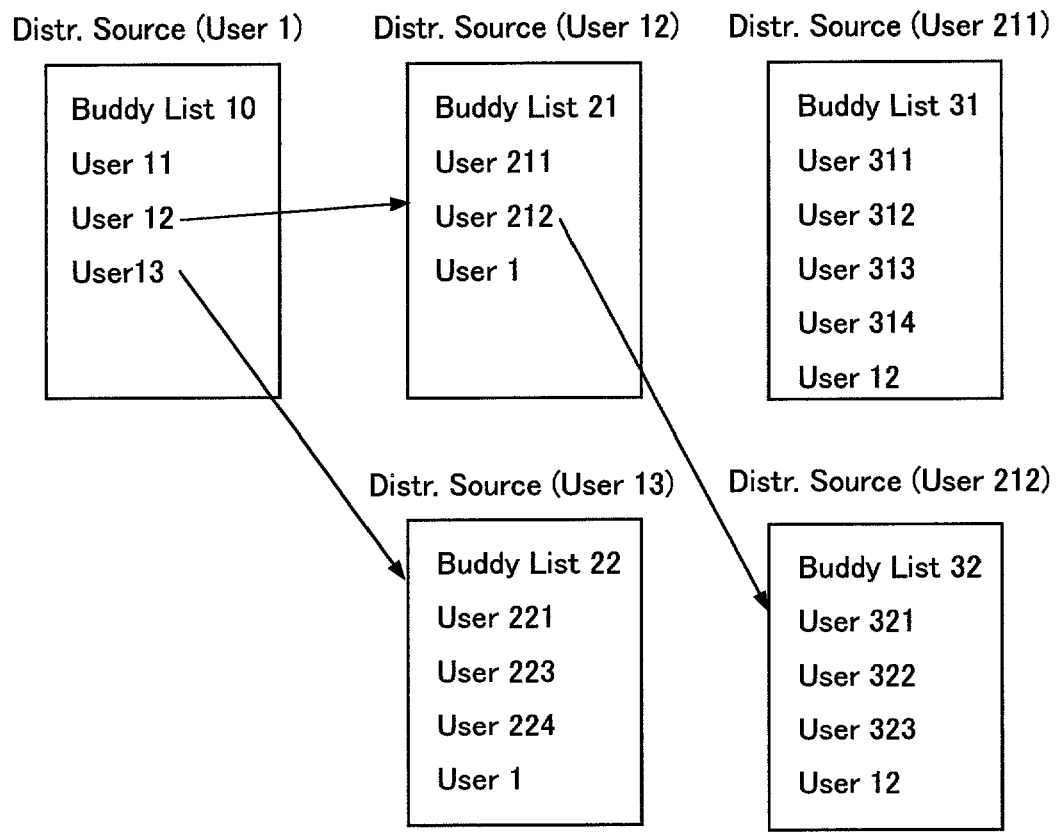
FIG. 4 is an explanatory diagram showing an overview of the present invention.

Next, FIG. 4 will be used to explain the basic concepts behind the present invention. In FIG. 4, user 1 has a buddy list 10, and user 11, user 12 and user 13 are registered in the buddy list 10. When a needs message with user 1 is distributed to users 12 and 13, the needs message is further distributed to buddies of user 211 and user 212.

The distributed needs message is further distributed to buddies registered on buddy lists of the distributee users. In FIG. 4, user 12 has a buddy list 21 on which user 1, user 211 and user 212 are registered. Likewise, user 13 has a buddy list 22 on which user 1, user 221, user 223 and user 224 are registered. The needs message distributed to user 12 and user 13 is further distributed to those buddies with the exception of broadcast-destination buddies among buddies registered on buddy list 21 and buddy list 22.

In the same way, the users who have received the needs message transmit it to their own buddies. For instance, user 211 has a buddy list 31; and user 212, a buddy list 32. Accordingly, needs messages distributed to user 211 are further distributed to the buddies on buddy list 31. Needs messages distributed to user 212 are additionally distributed to the buddies on buddy list 32. It is preferable in this situation to omit the broadcast-source buddy, and buddies who are already through receiving needs messages from other users, from destinations for still further distribution. A needs message that distributor user 1 has distributed is transmitted in succession by this reiteration in accordance with information-exchange relationships created among users, i.e., buddy lists.

Figure 5:
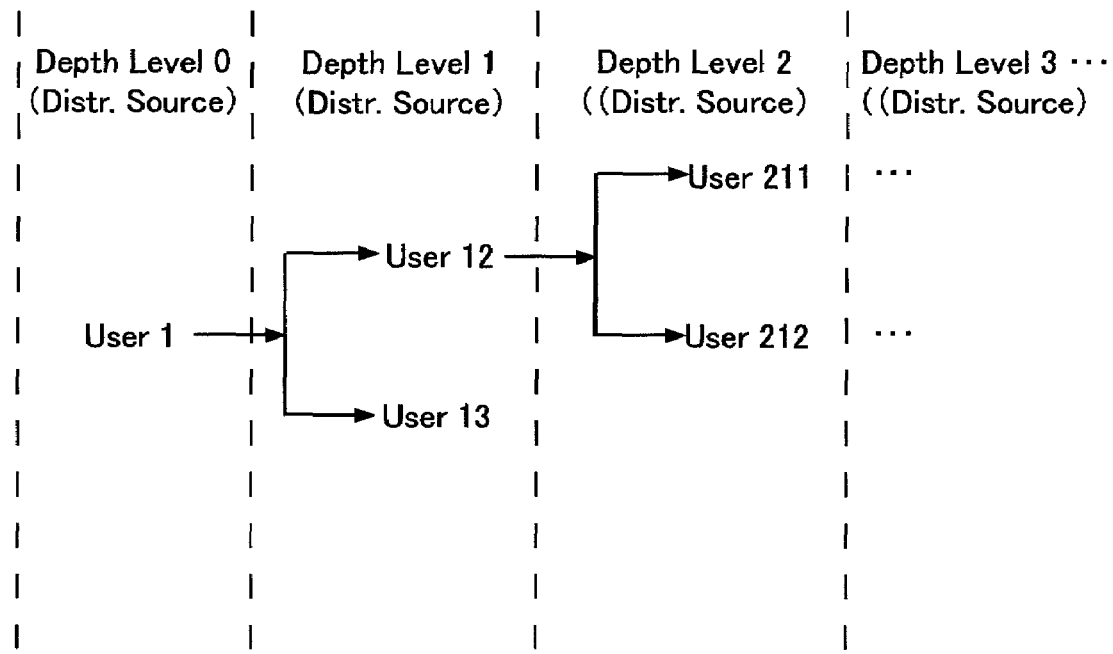
FIG. 5 is an explanatory diagram of depth levels.

FIG. 5 is an explanatory diagram illustrating the concept of "depth levels" used in the following explanation. When a needs message is distributed from user 1 to other users in succession as shown in the foregoing FIG. 4, to express the degree in proximity of the relationships of the other users to distributor user 1, a "depth level" is defined as follows. Using FIG. 5, distributor user 1 is put at depth level 0;and users who receive a needs message from distributor user 1—herein, users 12 and 13—are put at depth level 1. Users who received the needs message from users at depth level 1—herein, user 211 and user 212—are put at depth level 2. Similarly, users would be depth level 3, depth level 4. . . . therein below. In other words, if based on users'buddy lists a tree structure is imagined taking the distributor user to be the root, the depth levels go up as far as possible from the root.

(3) Functions of Modules

Next, the functions of each of the programs on the buddy client 2 and the buddy server 3, as well as the informational content of each of the databases on the buddy server 3, will be explained using FIGS. 6-18. In this instance, an example in which a single user can register a plurality of buddy lists will be illustrated.

Figure 6A:
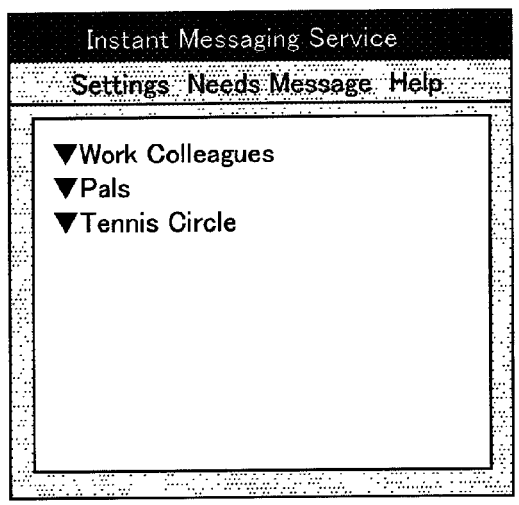
FIG. 6 is a buddy list display example.
Figure 6B:
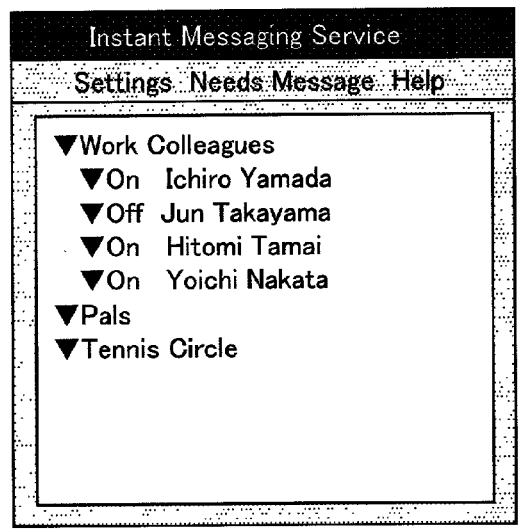
Figure 6C:
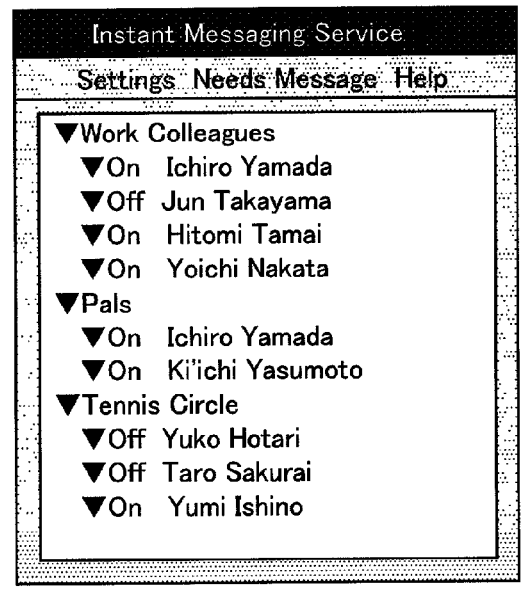

FIG. 6 shows a buddy-list display example that buddy client 2 outputs. Preparation of buddy lists is carried out by the buddy/buddy-list preparation function that the buddy client module 24 includes. Buddy-list display is carried out by the information input/output function noted earlier. Prepared buddy lists are stored and administered by the buddy/buddy-list administration function of the buddy server module 36. Part (a) in FIG. 6 shows an instance in which the three buddy-list names "work colleagues," "pals" and "tennis circle" are displayed, in a case where buddy lists of three kinds are registered. Part (b) in FIG. 6 shows, wherein "work colleagues" has been selected from among the three buddy lists just mentioned, a situation in which names of each of the buddies registered in the buddy list are displayed. Part (c) in FIG. 6 in a similar way shows a situation in which the buddies on the other buddy lists "pals" and "tennis circle" are displayed.

FIG. 7 is display examples of a dialogue through IMs (instant messages), which buddy client 2 outputs. The IM input and output is carried out by the information input/output function of the buddy client module 24. An input IM is distributed to the other buddy clients 2 by the information distribution function that the buddy server module 36 in buddy server 3 includes. In this example, an IM that user "Shigeo Tsujii" has input is transmitted via buddy server 3 to buddy client 2 that user "Ichiro Yamada" operates. The information input/output function of Ichiro Yamada's buddy client module 24 displays the received IM on the screen.

Figure 7A:
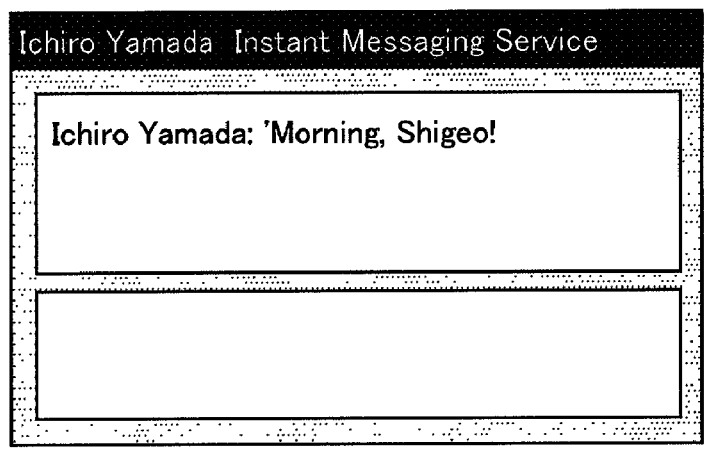
FIGS. 7A, B, and C are display examples of a conversation through instant messages.
Figure 7B:
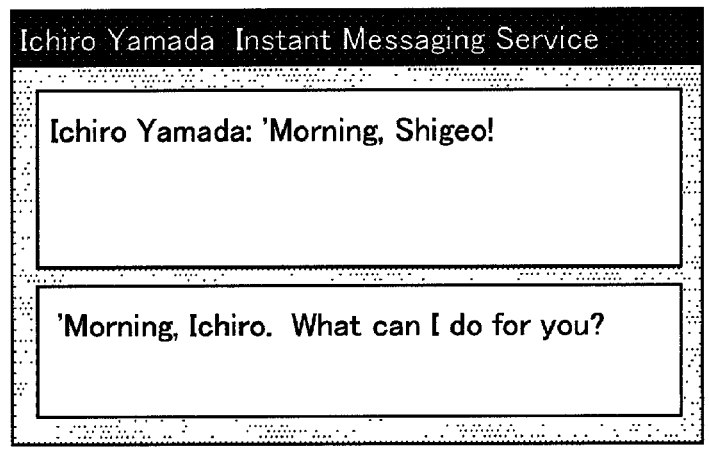
Figure 7C:
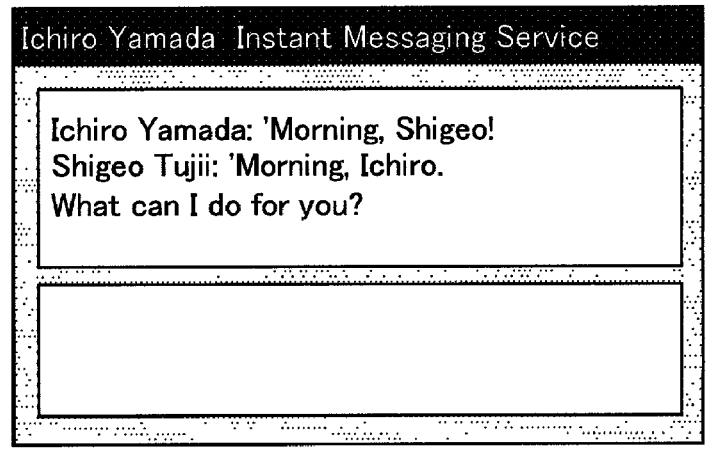

FIG. 7A is a screen example that user Shigeo Tsujii's buddy client displays. Herein, a message, "Morning, Shigeo!" from user Ichiro Yamada, who has registered user Shigeo Tsujii as a buddy, is displayed. FIG. 7B shows a state in which user Shigeo Tsujii has input the IM, "Morning, Ichiro. What can I do for you?" FIG. 7C illustrates, wherein user Shigeo Tsujii has, following IM input, authorized the IM by pressing a return key or the like, a state in which the inputted IM has been transmitted. The IM from user Shigeo Tsujii is thereby posted to user Ichiro Yamada.

Figure 8:
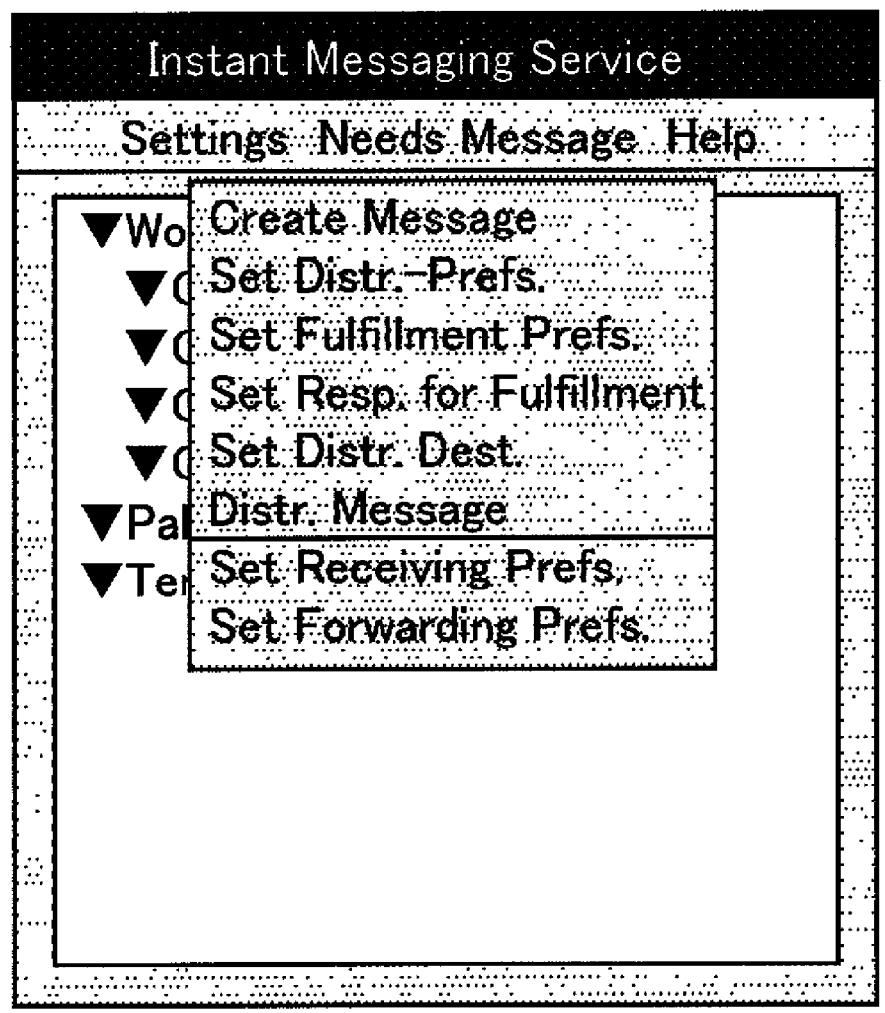
FIG. 8 is a needs-message menu display example.

FIG. 8 depicts a display example of a needs message menu. Eight functions are exemplified as the needs-message menu: (1) create message; (2) set distribution preferences; (3) set fulfillment preferences; (4) set responses for fulfillment; (5) set distributee; (6) distribute message; (7) set receiving preferences; and (8) set forwarding preferences. These eight functions are executed by the message creation module 21, the receiving-preferences configuration module 22, and the forwarding-preferences configuration module 23 in the buddy client 2. Each of these functions will be explained in further detail below.

FIG. 9A is an example of a needs-message creation screen. This screen is displayed by the message creation function of the message creation module 21. When "Create Message" is selected from within the needs-message menu in FIG. 8, this screen is displayed. In this example, the need message is composed of three components: greeting statement, text body, and feedback. The greeting is selected from any number of options that the message creation function has stored. The text body is prepared by accepting text input from the user. For the feedback, selection from among any number of options that the message creation function of the message creation module 21 has stored is accepted. When the "Set" button is pressed after finishing selection or else input of the greeting, text body, and feedback, the message creation module 21 transmits the created needs message to the buddy server 3. The user ID identifying the buddy client 2 is transmitted concomitantly at this time. The message-establishing module 31 in the buddy server 3 registers the needs message, assigning it a correspondence with the transmitting-source user ID, in the message DB 37.

FIG. 9B is an error-message display example. If any of the greeting statement, message body, or feedback has not been created, the message creation module 21 displays an error message along the lines of "Needs message not created properly."

Figure 10A:
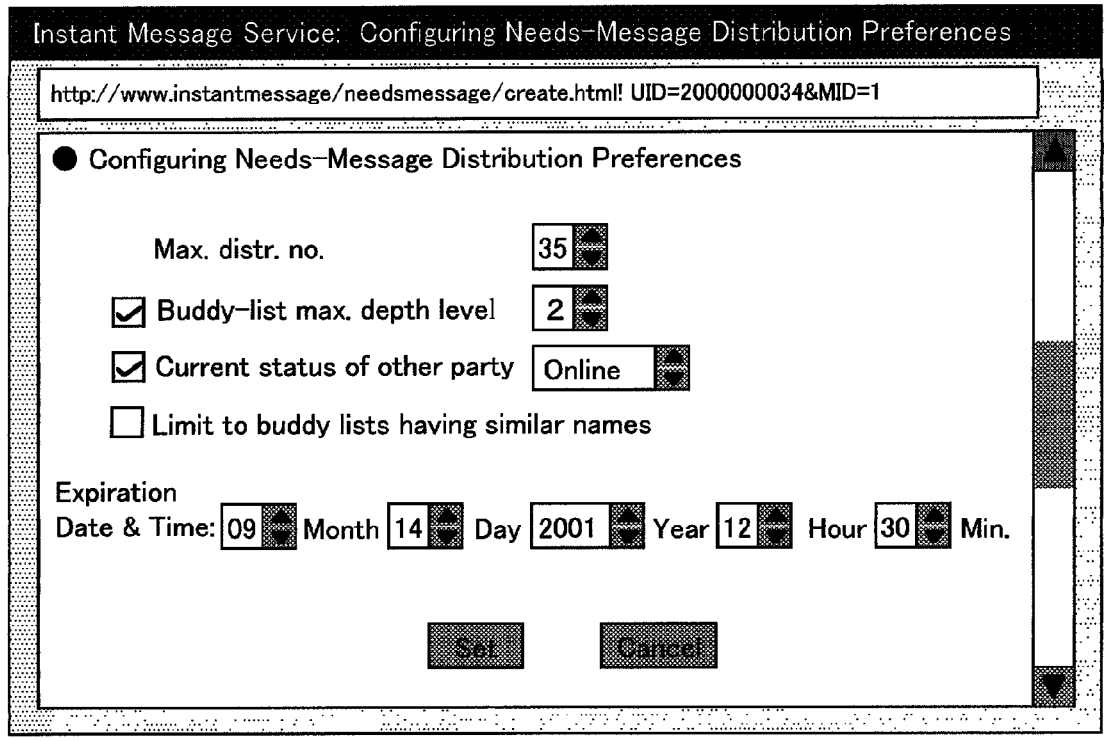
FIG. 10A is an example of a screen for configuring needs-message distribution preferences.

FIG. 10A is an example of a distribution-preferences configuration screen for needs messages. This screen is displayed by the distribution-preferences configuration function of the message creation module 21. When "Set Distr.-Prefs." is selected from within the needs-message menu in FIG. 8, this screen is displayed. In this screen example, the essential distribution parameters for the needs message (equivalent to stop conditions) given on the screen are: "maximum distribution number," and "expiration date." Herein the maximum distribution number is set to 35; the expiration date and time, to Sep. 14, 2001, at 12:30. Further, as optional distribution parameters, one or a number of the preferences "Buddy-list maximum depth level," "Current status of other party," and "Limit to buddy lists having similar names" may be added. In this example, distributing message to depth-level 2 users, and distributing needs messages only to buddy clients who are on-line are added to the distribution preferences. When the "Set" button is pressed after configuring the distribution preferences, the message creation module 21 transmits the distribution preferences and the foregoing user ID to the buddy server 3. The message-establishing module 31 in the buddy server 3 registers the distribution preferences, assigning them a correspondence with the transmitting-source user ID, in the message DB 37.

Figure 10B:
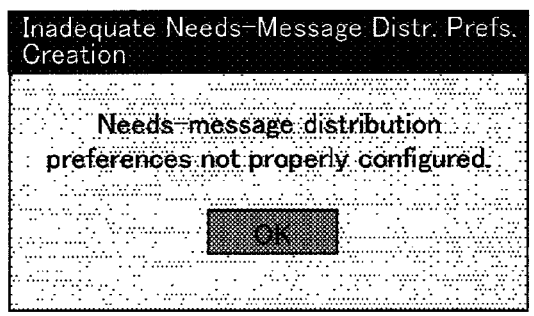
FIG. 10B is an error-message display example.

FIG. 10B is an error-message display example. If the "Set" button is pressed with the configuration of the distribution-preferences being inadequate, the message creation module 21 displays the error message "Needs-message distribution preferences not properly set," for example. This error message is also displayed when, with the configuration of the distribution-preferences being inadequate, "message distribution" in the aforementioned needs-message menu in FIG. 8 is selected.

Figure 11A:
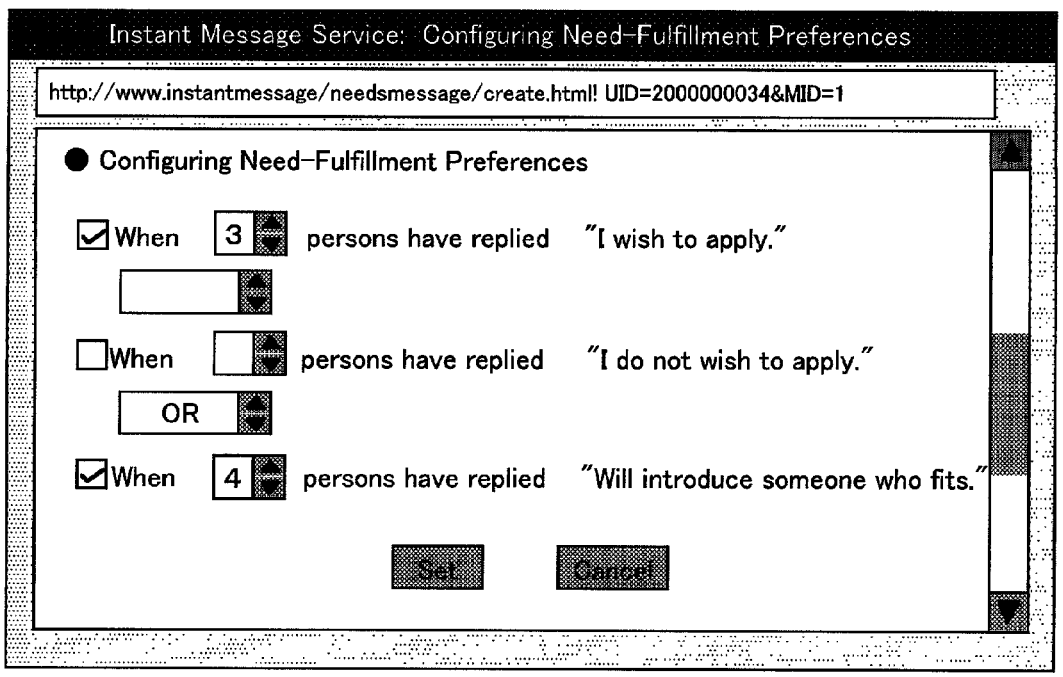
FIG. 11A is an example of a screen for configuring need-fulfillment preferences.

FIG. 11A is an example of a screen for configuring need-fulfillment preferences. This screen is displayed by the fulfillment-preferences configuration function of the message creation module 21. Further, when "Set Fulfillment Prefs." is selected from within the foregoing needs-message menu in FIG. 8, this screen is displayed. Herein, settings such as whether a need is deemed to have been fulfilled if the feedback set on the need-message creation screen (FIG. 9) is gathered, for example, in some number of actions; and whether relationships between the feedback options are "OR" or "AND," are made as need-fulfillment preferences. In this example, the need-fulfillment preferences that are set indicate that the need is deemed to have been fulfilled when the feedback option "I wish to apply" has come from three persons, or when the feedback option "Will introduce someone who fits" has come from four persons. When the "Set" button is pressed after configuring the need-fulfillment preferences, the message creation module 21 transmits the need-fulfillment preferences and the foregoing user ID to the buddy server 3. The message-establishing module 31 in the buddy server 3 registers the need-fulfillment preferences, assigning them a correspondence with the transmitting-source user ID, in the message DB 37.

Figure 11B:
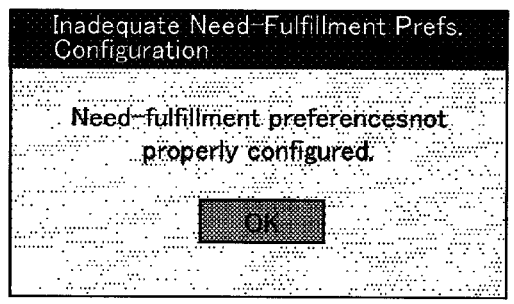
FIG. 11B is a first example of an error-message display.
Figure 11C:
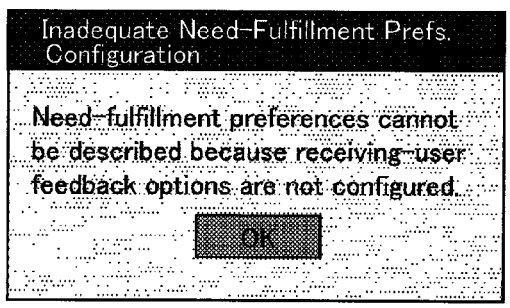
FIG. 11C is a second example of an error-message display.

FIG. 11B is an error-message display example. If the "Set" button is pressed with the configuration of the needs-fulfillment preferences being inadequate, the message creation module 21 displays the error message "Need-fulfillment preferences not properly set," for example. FIG. 11C is a different error-message display example. At the stage where a needs message has not been created, i.e., at the stage where the foregoing feedback have not been set, if opening the screen for configuring the needs fulfillment preferences is attempted, the message creation module 21 displays the error message "Need-fulfillment preferences cannot be described because receiving-user feedback options are not set."

Figure 12A:
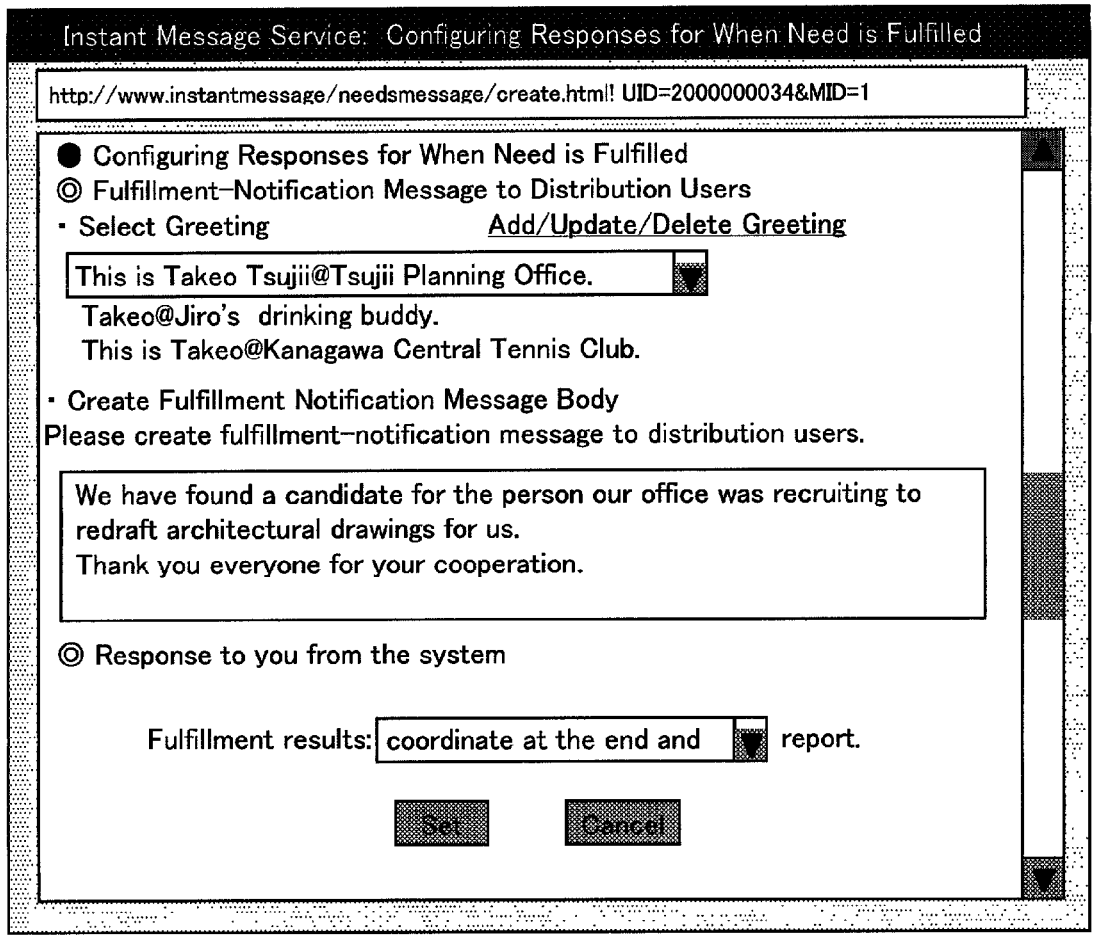
FIG. 12A is an example of a screen for configuring responses for when a need is fulfilled.

FIG. 12A is an example of a screen for configuring responses for when a need is fulfilled. This screen is displayed by the responses-at-fulfillment configuration function of the message creation module 21. Further, when "Set Resp. for Fulfillment" is selected from within the foregoing needs-message menu in FIG. 8, this screen is displayed. Wherein a need has been fulfilled, a fulfillment-notification message is configured on this screen, for notifying the distributor and the distributee, respectively, that the need has been met. The fulfillment-notification message to the distributee is made up of a greeting statement, and a fulfillment-notification message body. The greeting is prepared in this example by selecting any of several options stored in the message creation module 21. As to preparation of the fulfillment-notification message body, it is prepared by the inputting of text by the user operating the buddy client 2 that will be the distributor. The way that the distributor is notified is set to "coordinate at the end and report" in this example. When the "Set" button is pressed after establishing the fulfillment-notification message to the distributees and the way of notifying the distributor, i.e., after configuring the responses, the message creation module 21 transmits the configured responses and the foregoing user ID to the buddy server 3. The message-establishing module 31 in the buddy server 3 registers the configured responses together with the transmitting-source user ID in the message DB 37.

Figure 12B:
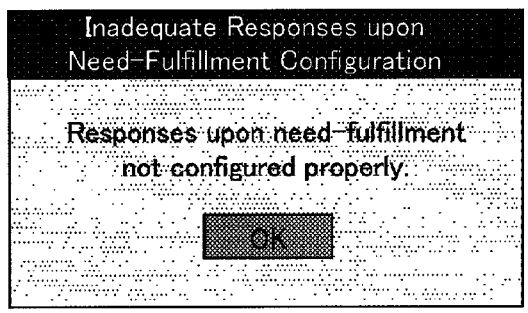
FIG. 12B is an error-message display example.

FIG. 12B is a display example of an error message displayed if the "Set" button is pressed with the configuration of responses for when a need is fulfilled being inadequate. The message creation module 21 displays the error message "Responses upon need-fulfillment not configured properly," for example. This error message is also displayed when, with the responses for when a need is fulfilled not being configured, "message distribution" is selected from within the needs-message menu.

Figure 13A:
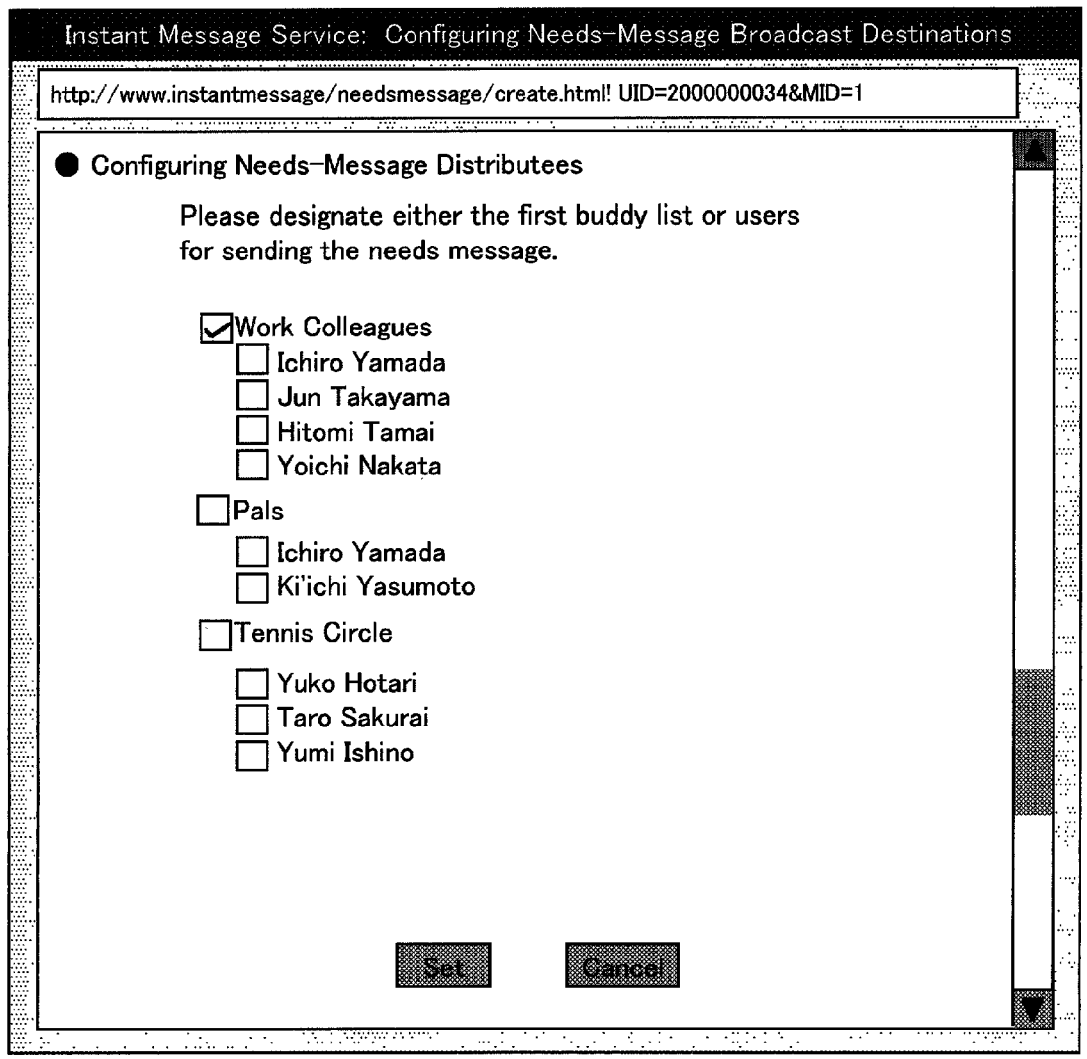
FIG. 13A is an example of a screen for configuring needs-message distributees.

FIG. 13A is an example of a screen for configuring needs-message distributees. This screen is displayed by the distribution-preferences configuration function of the message creation module 21. Further, this screen is displayed by selecting "Set Distr.-Prefs." from within the foregoing needs-message menu in FIG. 8. Through this screen, the user operating a buddy client 2 may designate one or a number of users and buddy lists as distributees for the first needs message. In this example, buddy list "Work Colleagues" has been designated a distributee, and "Ichiro Yamada," "Jun Takayama," "Hitomi Tamai," and "Yoichi Nakata" included in the buddy list (depth-level 1 buddy list in terms of FIG. 5) will be the first distributees. When the "Set" button is pressed after designating the distributees, the buddy client 2 transmits the designated distributees and the foregoing user ID to the buddy server 3. The message-establishing module 31 in the buddy server 3 registers the distributes IDs, assigning them a correspondence with the user ID, in the message DB 37.

Figure 13B:
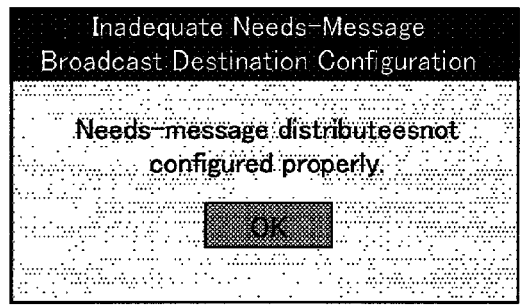
FIG. 13B is an error-message display example.

FIG. 13B is a display example of an error message displayed if the "Set" button is pressed without designating needs-message distributees. The message creation module 21 displays the error message "Needs-message distributees not set properly," for example. The same error message is also displayed when "message distribution" on the foregoing needs-message menu is selected even though distributees have not been set.

FIG. 14 depicts one example of a distribution confirmation screen. This screen is displayed by the distribution command function of the message creation module 21. Further, this screen is displayed by selecting "Distr. Message" in the foregoing needs-message menu in FIG. 8. The message creation module 21 displays the confirmation message "Distribute needs message?" for example. When the "OK" button is pressed in answer, the message creation module 21 transmits a distribution command together with a user ID for the buddy client 2 to the buddy server 3. When it receives the distribution command, the buddy server 3 launches distribution of the needs message specified by the user ID. If the "Cancel" button is selected, the distribution command is not transmitted.

FIG. 15 is an example of a screen for configuring needs-message receiving preferences. This is a screen for configuring preferences as to whether or not, when a needs message has been set in from another user, the needs message is to be received. This screen is displayed by the receiving-preferences configuration module 22 in the buddy client 2. Further, selecting "Set Receiving Prefs." in the foregoing needs-message menu in FIG. 8 displays this screen. In this example, "Receive needs messages depending on preferences." has been selected as one receiving preference. Further as the preference, making confirmation of authorization prior to receiving a needs message has been selected. Moreover, receiving needs messages from users "Hitomi Tamai," "Ichiro Yamada," "Ki'ichi Yasumoto," and "Taro Sakurai" without confirming authorization has been set. Further still, a separate preference is a setting to receive needs messages only when the buddy client 2 itself is on-line. When the "Set" button is pressed after configuring the receiving preferences, the receiving-preferences configuration module 22 in the buddy client 2 transmits the set receiving preferences and the foregoing user ID to the buddy server 3. The buddy server 3, by means of the receiving-preferences administration module 32 registers the receiving preferences, assigning them a correspondence with the user ID, in the receiving DB 38.

Figure 16:
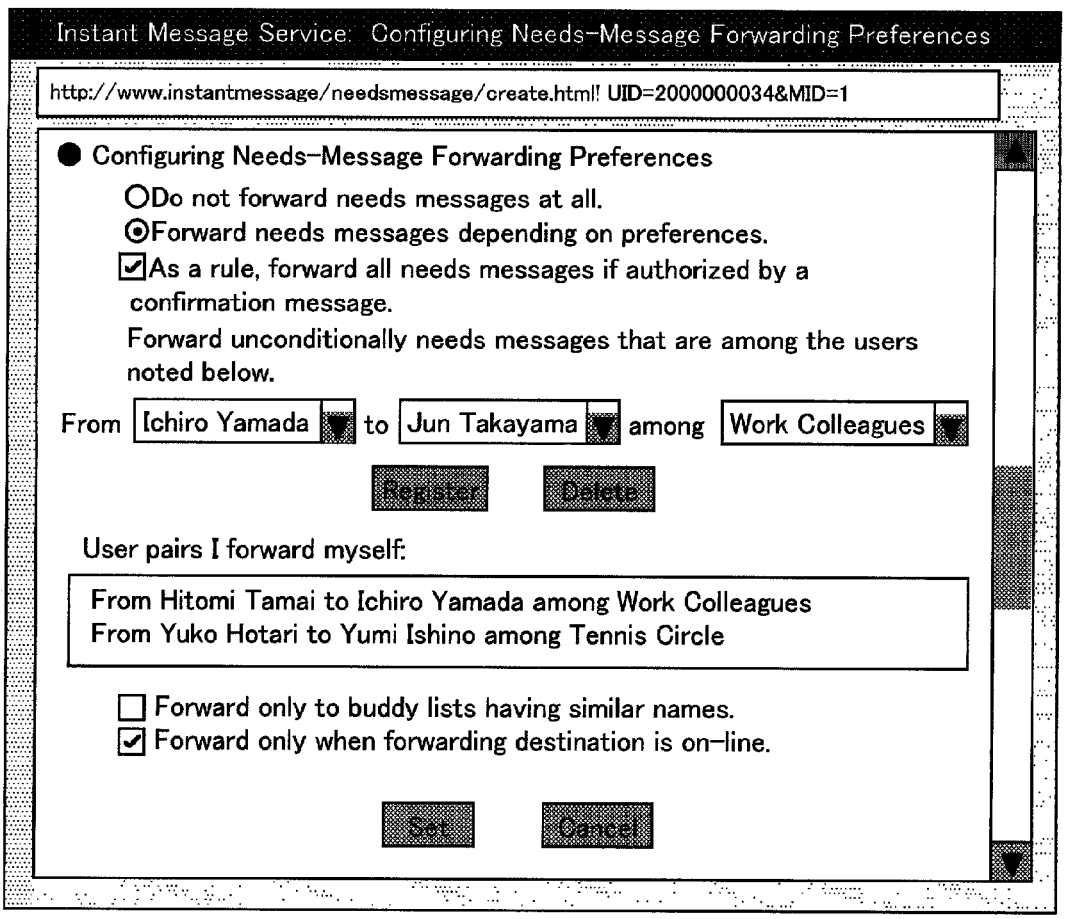
FIG. 16 is an example of a screen for configuring needs-message forwarding preferences.

FIG. 16 is an example of a screen for configuring needs-message forwarding preferences. This is a screen for configuring whether or not to allow forwarding of received needs messages to buddies included on buddy list(s) one has registered. This screen is displayed by the forwarding-preferences configuration module 23 in the buddy client 2. Further, selecting "Set Forwarding Prefs." in the foregoing needs-message menu in FIG. 8 displays this screen. In this example, "Forward needs messages depending on preferences." has been selected. As a forwarding condition, confirming authorization prior to forwarding has been made a preference. Moreover, forwarding needs messages transmitted from user "Ichiro Yamada" to Jun Takayama without confirming authorization has been set. Yet further, forwarding only when the forwarding-destination buddy client 2 is on-line is set as a separate preference. When the "Set" button is pressed after configuring the forwarding preferences, the forwarding-preferences configuration module 23 transmits the forwarding preferences and the user ID to the buddy server 3. The buddy server 3, by means of the forwarding-preferences administration module 33 registers the forwarding preferences, assigning them a correspondence with the user ID, in the forwarding DB 39.

(4) Needs-Message and Need-Fulfilled Display Examples

Figure 17:
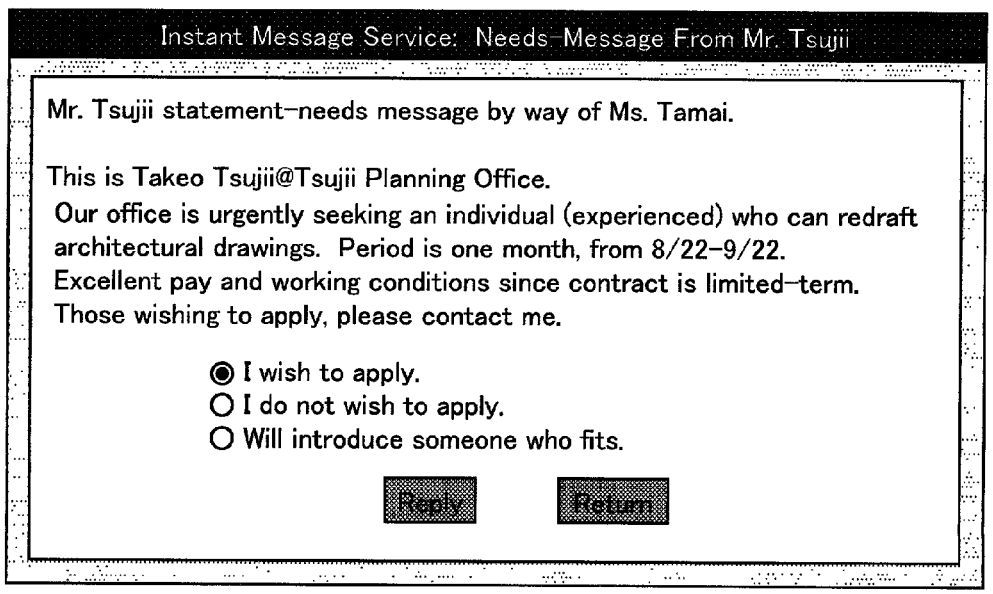
FIG. 17 is a (distributee) needs-message display example.

FIG. 17 is a display example of a needs message that the buddy client 2 at the distributee of the needs message displays. The distributee user name and the user name of that buddy client 2 to which the needs message has been directly transmitted—i.e., the intermediary's name—are displayed on this screen. The intermediary's name is displayed because in this case the distributor and the distributee are supposed not to know each other. The user who has received the needs message selects on this screen any of the feedback options that the distributor has configured. When, for example, "I wish to apply." is selected and the "Reply" button pressed, the distributee ID and the selected feedback option are transmitted to the buddy server 3. The moment this answer to the needs message comes, the task administration module 35 in the buddy server 3 decides whether or not the need has been fulfilled.

Figure 18A:
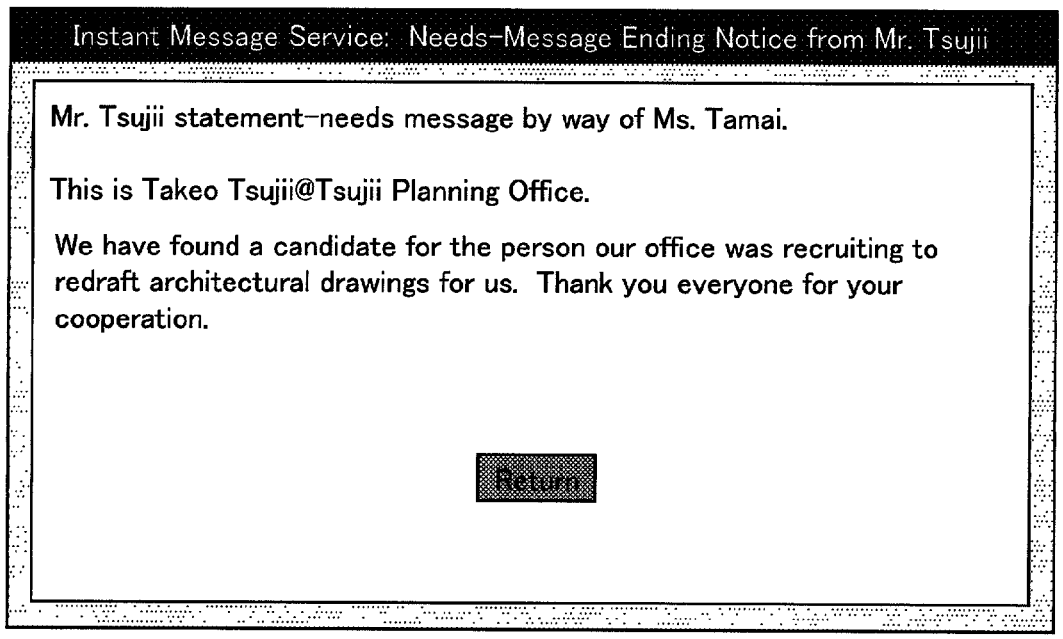
Figure 18B:
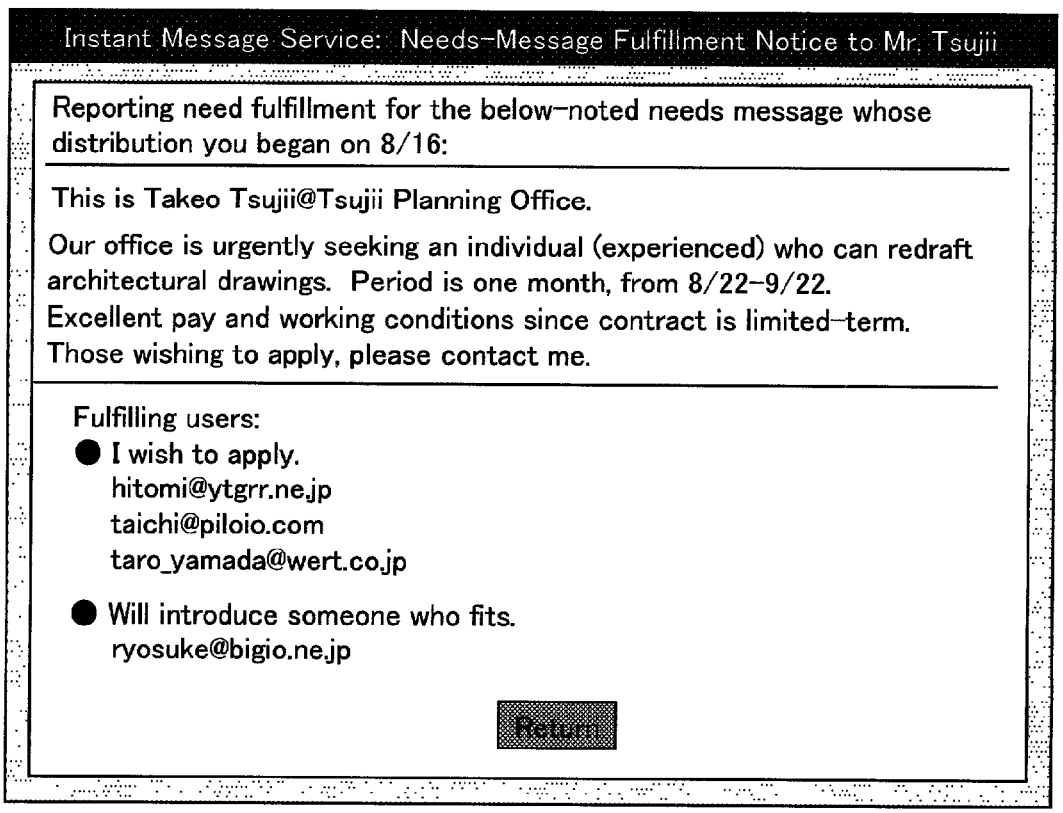

FIG. 18 is examples of display when need fulfilled. FIG. 18A is a display example of a fulfillment-notification message at the distributee. The distributes buddy client 2 displays as an IM, by means of its buddy client module 24, a fulfillment-notification message prepared with the distributor user name, an intermediary name, and the distributee. FIG. 18B is an example of a response display on the distributor's buddy client 2. A text message, etc. indicating that the distributor's need has been fulfilled is displayed on this screen. The needs message that the distributor distributed may also be displayed. Moreover, the e-mail addresses, for example, of the distributee users who contributed to fulfillment of the need are displayed. Distributee users who contributed to fulfillment of the need are those users whose feedback fits the need-fulfillment conditions that the distributor configured.

(5) Data Stored in Server

FIG. 19 is explanatory diagrams indicating the structure of data stored in the databases in the buddy server 3 according to needs-message preparation, receiving-preference configuration, and distribution-preference configuration. FIG. 19A indicates the structure of data stored in the message DB 37. Needs messages, distribution preferences, fulfillment preferences, and responses at fulfillment are stored in the message DB 37 according to respective user ID. Herein, greeting statement, message text body, and configured response options are contained in the needs message.

FIG. 19B is an explanatory diagram indicating the structure of data stored in the receiving DB 38. User IDs and receiving preferences are recorded, with correspondences assigned between them, in the receiving DB 38.

FIG. 19C is an explanatory diagram indicating the structure of data stored in the forwarding DB 39. User IDs and forwarding preferences are stored, with correspondences assigned between them, in the forwarding DB 39.

FIG. 20 is an explanatory diagram indicating the structure of data stored in a task DB 310. Data is stored in task units in the task DB 310. One task contains a task ID, task status, distributor ID, depth level, distributee candidate ID, and process status. Thereamong, only that number of the three items depth level, distributee candidate ID, and process status is generated that is the distributee candidate count, determined based upon the distributees, and the buddy list(s) in the buddy client 2, which are configured by the needs message. Here, "distributor ID" is the user ID for the buddy client 2 that is the distributor. "Distributee-candidate ID" is a buddy-list ID or user ID identifying a distributes configured in terms of the needs message, or a buddy-list ID or buddy-user ID for the buddy client 2 to which the needs message is transmitted.

(6) Process Flow

Next the flow of processes that the buddy server 3 carries out will be specifically explained. The buddy server 3 carries out processes that divide grossly into a distribution routine and a fulfillment routine. FIGS. 21-23 are flowcharts illustrating flow of the distribution routine. In the distribution routine, according to a distribution command from any of the buddy clients 2, the buddy server 3 distributes a needs message created by the command source to the other buddy clients 2.

Step S1: The distribution module 34 stands by for a distribution command from the buddy client 2, and when it receives one, step S2 ensues.

Step S2: The task administration module 35 allots a new task ID to a fresh distribution task, and registers the task ID in the task DB 310.

Step S3: Based on distributor configured by the needs message, or on the buddy list in the transmitting-end buddy client 2, the distribution module 34 acquires depth-level 1 distributee IDs. For example, wherein the distributor is on the transmitting end, the needs-message distributes IDs that the distributor has configured are acquired. Wherein the depth-level 1 buddy client 2 is on the transmitting end, buddy-list IDs or buddy-user IDs in the depth-level buddy client 2 are acquired.

Using the foregoing FIG. 4 to explain specifically, initially user IDs for user 12 and user 13 that distributor user 1 has designated as distributees are acquired. Wherein a needs message is transmitted to user 12 and user 13 according to the following steps S4-S30, buddy-list and buddy IDs for users 12 and 13 are acquired.

Step S4: The distribution module 34 decides whether the acquired distributee ID(s) is/are a buddy-list ID or plurality of user IDs. If "Yes," is decided, step S5 ensues; if "No" is decided, later-described step S6 ensues.

Step S5: The distribution module 34, if the distributee ID is a buddy-list ID, acquires the buddy-user IDs contained in the buddy list, and makes them distributee candidates. In an instance where the distributes IDs are user IDs, the user IDs are made distributee candidates. Subsequently, the distribution process of steps S6-S30 is executed respectively for each distributee candidate specified by the user IDs.

Step S6: The distribution module 34 decides during the course of the distribution process carried out for each of the distributes candidates whether or not the distributee candidate that is the target of the process is at the maximum depth level. The fact that needs-message distribution processes for each of the distributee candidates are conducted in parallel means that distribution processes running parallel are carried out with respect to distributee candidates positioned at various depth levels. This step is provided, then, because the distribution processes are carried out giving priority to distributes candidates whose depth level is shallow. If "Yes" is decided, step S7 ensues; if "No" is decided, later-described step S9 ensues.

Step S7: The distribution module 34 consults the task DB 310 to decide whether or not a process among the distribution processes for the distributee candidates whose depth levels are shallower has ended. The presence/absence of a process that is delayed for a reason apart from the exception of a later-described process, for awaiting confirmation from a user, not being finished is decided at this time. If "Yes" is decided, step S8 ensues; if "No" is decided, later-described step S9 ensues.

Step S8: The distribution module 34, in response to a delay cause, suspends for a fixed period the distribution process with respect to the distributee candidates.

Step S9: The distribution module 34 decides whether or not the distributee candidates satisfy the distribution preferences (equivalent to stop conditions) configured in the needs message. This determination is carried out by consulting the distribution preferences that are stored in the message DB 37. If the distribution preferences are not satisfied, step S10 ensues. If the distribution preferences are satisfied, later-described step S13 ensues.

Step S10: The distribution module 34 consults the task DB 310 to decide whether or not the maximum distribution count configured by the distribution preferences has already been surpassed. If "Yes" is decided, step S11 ensues. If "No" is decided, later-described step S12 ensues.

Step S11: The task administration module 35 sets the task status as "end." Because the maximum distribution number has been surpassed, this is in order to end compulsorily the distribution process for needs messages beyond that.

Step S12: The task administration module 35 sets the distribution process status for the distributee candidates to "stop distribution."

Step S13: The distribution module 34 decides whether the depth level of the distributee candidate is 1 or not. If "Yes" is decided, later-described step S21 ensues. "Yes" is decided wherein the transmitting end is the distributor, and the buddy client 2 that the distributor has configured as the needs-message distributee is the distributes candidate. If "No" is decided, step S14 ensues. This is because for deciding whether or not to transmit a needs message that is from a distributor to its buddies, the decision as to whether or not the distributor's forwarding preferences have been met (steps S14-S20) is unnecessary.

Step S14: Steps S14-S20 are a process that, wherein the transmitting end is depth level 1 or more, decides whether or not the forwarding preferences on the transmitting end are met. Initially, the distribution module 34 decides whether or not the transmitting-end forwarding preferences are met. If for example users 211 and 212 in the foregoing FIG. 4 are distributes candidates, the decision would be whether or not user 12's forwarding preferences are met. If "Yes" is decided, step S15 ensues. If "No" is decided, the routine returns to aforementioned step S12, and the process for distribution to distributee candidates stops.

Step S15: The distribution module 34 decides whether or not it is necessary to transmit a confirmation message to the transmitting-end buddy client 2. "Yes" would be decided, for example, in the case in which user 12, who sends to users 211 and 212, in aforementioned FIG. 4 has set "confirmation message" as a forwarding preference. If "Yes" is decided, step S16 ensues; if "No" is decided, later-described step S21 ensues.

Step S16: The distribution module 34 transmits a confirmation message to the transmitting-end buddy client 2. This may be carried out via the buddy server module 36.

Step S17: The task administration module 35 sets the status of the process for the process-target distributee candidates to "await confirmation," and updates the task DB 315.

Step S18: The task administration module 35 stands by for a reply from the transmitting-end buddy client 2. Step S19 ensues when there is a reply.

Step S19: The task administration module 35 puts the status of the process for the process-target distributee candidates from await-confirmation into a released state.

Step S20: The distribution module 34 decides whether or not the reply is "authorized," and if authorized, i.e., "Distribution OK," step S21 ensues. Otherwise, aforementioned step S12 ensues, and the process for distribution to the distributee candidates who are process targets is stopped.

Step S21: Next, in steps S21-S27 it is decided whether or not the receiving preferences of the receiving-end buddy client 2 are met. Initially, the distribution module 34 consults the receiving DB 38 to decide whether or not the receiving preferences of the process-target distributee candidates are met. If "Yes" is decided, step S22 ensues. If "No" is decided, earlier-described step S12 ensues, and the process for distribution to the process-target distribution candidates is ended.

Step S22: The distribution module 34 decides whether or not confirmation per a confirmation message is configured by the distributee-candidate receiving preferences. If "Yes" is decided, step S23 ensues; if "No" is decided, later-described step S28 ensues.

Step S23: The distribution module 34 transmits the confirmation message to the distributee candidates via the buddy server module 36.

Step S24: The task administration module 35 changes the status of the process for the process-target distributee candidates to "await confirmation."

Step S25: The distribution module 34 stands by for a reply from a distributee candidate, and when there is a reply, step S26 ensues.

Step S26: The task administration module 35 puts the status of the process-target distributee candidates from await-confirmation into the released state.

Step S27: The distribution module 34, based on the content of the reply in step S25, decides whether or not distribution is OK, and if "Yes" is decided, step S28 ensues. If "No" is decided, the earlier-described step S12 ensues, and the process for distribution to the process-target distribution candidates is ended.

Step S28: The distribution module 34 decides whether or not the task should be compulsorily terminated. This is decided according to whether or not "end" is written in the task status of the task DB 312. For instance, if a need is fulfilled while a needs message is under distribution, the task is compulsorily terminated by a later-described fulfillment process. If not compulsorily terminated, step S29 ensues. If compulsorily terminated, aforementioned step S12 ensues, the status of the process for the process-target distributes candidates is set to "stop distribution," ending the present distribution process.

Step S29: The distribution module 34 executes transmission of the needs message to the process-target distributee candidates.

Step S30: The task administration module 35 sets the task status, which is equivalent to the task ID, to "end." Thereafter, the routine once more returns to aforementioned step S3, and a distributee ID is acquired. For example, wherein a needs message is to be transmitted to user 12 in the foregoing FIG. 4, a buddy-list ID for buddy list 21 is acquired based on user 12's buddy lists. Thereafter, the same processes as described earlier from then on are carried out for each user 211 and 212 included in the buddy list 21.

FIG. 24 is a flowchart illustrating flow of a fulfillment routine that the buddy server 3 carries out. The task administration module 35 carries out, independently of the foregoing distribution routine, a fulfillment routine; and compulsorily terminates the distribution routine if at the point in time a need is fulfilled the distribution routine is running. The following routine is launched by the starting of the aforesaid distribution routine.

Step S41: The task administration module 35 reads out from the message DB 37 fulfillment preferences in the needs message for which the distribution routine has been started.

Step S42: The task administration module 35 stands by for a reply from needs-message distributee buddy clients. When there is any reply, step S43 ensues.

Step S43: The task administration module 35 decides based on the reply content whether or not the need is fulfilled. If "Yes" is decided, step S44 ensues. If "No" is decided, the routine once more returns to aforementioned step S42, and another reply is awaited.

Step S44: The task administration module 35 decides whether or not the distribution process specified by the task ID is running. If "Yes" is decided, step S45 ensues; if "No" is decided, later-described step S46 ensues.

Step S45: The task administration module 35 writes the task status as "end" in the task DB3 10, compulsorily terminating the distribution process. This is because with the need being fulfilled, distributing the needs message any further is no longer necessary.

Step S46: The task administration module 35 reads out the fulfillment-notification message from the message DB 37, and transmits it to the distributee. Likewise, a report to the effect that the need has been fulfilled is transmitted to the distributor.

Other Embodiment Examples (A) Preventing Duplicate Distribution

In the foregoing distribution routine, it is preferable in step S5 to strike from the distributes candidates a buddy client 2 having once received a needs message. This is in order to prevent duplicate transmission of a needs message to the same buddy client.

(B) Offering Incentives

In the foregoing distribution process, some incentive or other may be offered from the system end or the distributor to a buddy client 2 user who does the courtesy of forwarding a needs message. It is also conceivable to make it possible to establish, when the needs message is prepared, compensation for the user who kindly fulfills the need.

(C) Separate Example of Distribution Preferences (Buddy List whose Names are Similar)

Although not check-marked in the FIG. 10 example, wherein "Limit to buddy lists having similar names" is designated, only buddies registered in buddy lists that are analogous to the name of the buddy list in which the buddy designated as the first distributee is registered are set as broadcast destinations. For example, in the foregoing FIG. 13 instance, the buddy list "Work Colleagues" is designated as the first distributee. Among buddy lists registered respectively by Ichiro Yamada," "Jun Takayama," "Hitomi Tamai," and "Yoichi Nakata," who are to be the first distributees, only buddies who are included in buddy lists identically named "Work Colleagues," or in buddy lists with analogous names are picked out as distributes candidates. Names such as "company," "office," "XX Dept.," etc. that could be thought of as work-colleague buddy lists are analogous names for example.

FIG. 25 is a flowchart illustrating flow of a process for judging whether or not buddy-list names resemble. Herein, judgment as to the degree of resemblance is carried out utilizing a synonym DB in which information on synonyms is registered. After distributee candidates have been picked out, the names of buddy lists that are stored in correspondence with the picked-out users are acquired. The resemblance between the names of the buddy lists designated by the distribution preferences, and each of the names of the acquired distributee-candidate buddy lists, is computed (step S51). Resemblance herein is expressed as a value that is the higher the more alike are the meanings of the words compared. If the computed resemblance surpasses a predetermined reference value (if "Yes" in step S52), needs message distribution is carried out continuously to the users included in that buddy list (step S53). If the computed resemblance is below the predetermined reference value, (if "No" in step S52), distribution of the needs message is stopped (step S54).

(D) The present invention includes programs that realize the foregoing method, as well as computer-readable recording media on which the programs are recorded. As examples of recording media herein, flexible disks, hard disks, semiconductor memory, CD-ROMs, DVDs, magneto-optical disks (MOs), and other computer-read/writeable recording media may be cited.

Using the present invention takes advantage of information-exchange relationships among users to let information be distributed to great numbers of persons on a network.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An information-distribution method utilized by a system including a plurality of user terminals and a computer connected to the user terminals via a network, the information-distribution method including:

accepting, from any of the user terminals, designation of at least one other user terminal among the user terminals, by the computer;

storing, by the computer, a buddy list in which at least one identifier identifying a user terminal is correlated with at least one other identifier identifying the at least one other user terminal designated in said accepting designation;

accepting, by the computer, from a source user terminal among the user terminals, a distribution content to be distributed and a distribution condition according to which the distribution content is distributed, the distribution condition including a stop condition, but neither the distribution content nor the distribution condition specifying any destination to which the distribution content to be distributed;

determining, by the computer, one or more primary destination user terminals to which the distribution content will be distributed, the primary destination user terminals being selected from user terminals whose identifiers are correlatively stored with the identifier of the source terminal in the buddy list, in accordance with the distribution condition;

transmitting, by the computer, the distribution content to the one or more primary destination user terminals;

until the stop condition is satisfied, by any recipient user terminal that has received the distribution content, determining one or more next-destination user terminals to which the recipient user terminal distributes the distribution content will be distributed, the one or more destination user terminals being selected from user terminals in a buddy list of the recipient user terminal, in accordance with the distribution condition, and transmitting the distribution content from the recipient user terminal to the one or more next-destination terminal;

recording stop-condition candidates, wherein the stop condition candidates are alternatives for the stop distribution condition; and selecting at least one of the stop-condition candidates as the stop distribution condition by the source user terminal.

2. The information-distribution method set forth by claim 1, wherein the distribution condition sent by the source user terminal to the computer includes an identifier of a primary user terminal.

3. The information-distribution method set forth by claim 1, wherein the stop-condition candidates include a maximum count of user-terminals that distribute the distribution content.

4. The information-distribution method set forth by claim 1, wherein the stop-condition candidates include a depth-level restriction indicating path length between the source user terminal and user terminals to which the distribution content is distributed.

5. The information-distribution method set forth by claim 1, further including:
receiving, from reporter-user terminals among the user terminals, Status reports on user terminals; and
storing statuses of the user terminals as reported correctively with user identifiers identifying the reporter-user terminals, wherein the stop-condition candidates include a restriction of user terminals distributing the distribution content according to the corresponding status.

6. The information-distribution method set forth by claim 1, wherein the stop-condition candidates include an expiration date for distributing the distribution content.

7. The information-distribution method set forth by claim 1, wherein the distribution content contains a request of a user operating the source user terminal, and the stop distribution condition includes a fulfillment condition that serves as a judgment criterion for judging whether or not the request has been met.

8. The information-distribution method set forth by claim 7, further comprising:
storing fulfillment-condition candidates that are alternatives for the fulfillment conditions; and
accepting a selection of at least one of the fulfillment-condition candidates.

9. The information-distribution method set forth by claim 1, wherein
the distribution content contains a request by a user operating the source user terminal;
the distribution condition includes a fulfillment condition that serves as a judgment criterion for judging whether or not the request has been met, and
if the fulfillment condition has been met, user terminals to which the distribution content has been distributed and/or the source user terminal receive a response to the request.

10. The information-distribution method set forth by claim 9, further comprising:
storing response candidates that are alternatives for the response; and
selecting at least one of the response candidates.

11. The information-distribution method set forth by claim 9, wherein further comprising:
storing response candidates that are alternatives for the response, and
selecting at least one of the response candidates, wherein the response candidates include a response reporting, to user terminals to which the distribution content has been distributed and/or the source user terminal, that the fulfillment condition has been satisfied.

12. The information-distribution method set forth by claim 9, further comprising:
storing response candidates that are alternatives for the response, and
selecting at least one of the response candidates, wherein the response candidates include a response reporting to the source user terminal user identifiers identifying user terminals that have contributed to satisfying the fulfillment condition.

13. The information-distribution method set forth by claim 9, further including:
storing response candidates that are alternatives for the response, and
selecting at least one of the response candidates, wherein the response candidates include a response reporting, to user terminals to which the distribution content has been distributed and/or the source user terminal, that the fulfillment condition for which has been satisfied.

14. The information-distribution method set forth by claim 9, further including:
receiving a response from a user terminal to which the distribution content has been distributed;
judging, based on the received response whether or not the fulfillment condition has been satisfied; and
if the fulfillment condition has been satisfied, executing the response to the user terminals to which the distribution content has been distributed and/or the source user terminal.

15. The information-distribution method set forth by claim 1, further including:
receiving, from setter-user terminals among the user terminals, settings as to receiving conditions that serve as criteria for judging whether or not to receive the distribution content;
storing the receiving conditions correlatively with user identifiers identifying the setter-user terminals;
judging, prior to transmitting the distribution content, whether or not the receiving conditions are satisfied for a user terminal to selected to receive the distribution content; and
transmitting the distribution content if the receiving conditions are satisfied according to the judging.

16. The information-distribution method set forth by claim 1, further including:
receiving, from setter-user terminals among the user terminals, settings as to forwarding conditions that serve as criteria for judging whether or not to transmit to some or all of the destination user terminals the distribution content;
storing the forwarding conditions correlatively with user identifiers identifying the setter- user terminals;
judging whether or not the forwarding conditions are satisfied for a destination user terminal to which the distribution content has been distributed are satisfied; and
ending distribution for the destination terminal for which the forwarding conditions are not satisfied according to the judging.

17. The information-distribution method set forth by claim 1, further comprising:
judging whether or not the destination user terminals include any user terminals to which the distribution content has already been transmitted, so that the distribution content is transmitted only to the destination user terminals to which the distribution content has not already been transmitted.

18. The information-distribution method set forth by claim 1, further including:
storing incentive criteria for determining incentives offered to user terminals having received and/or transmitted the distribution content; and
offering, to the user terminals having received and/or transmitted the distribution content, incentives in accordance with the incentive criteria.

19. The information-distribution method set forth by claim 1, further comprising:

grouping the at least one other user identifiers in the buddy list, if more than one, and storing them group-by-group correlatively with group names, wherein the distribution condition includes identicalness or similarity between associations of the group names; and judging whether or not a group name stored correlatively with a source user identifier is identical with or similar to a group name designated by the distribution condition, and determining a user terminal stored correlatively with a group name judged to be an identical or similar user terminal to be a destination terminal to which the distribution content is distributed.

20. An information-distribution device connected to user terminals via a network, the information-distribution device comprising:

designation-accepting means for accepting from any of the user terminals designation of at least one other user terminal among the user terminals;

storing means for storing a buddy list in which at least one identifier identifying a user terminal is correlated with at least one other identifier identifying the at least one other user terminal whose designation has been accepted by said designation-accepting means;

information-accepting means for accepting, from a source user terminal among the user terminals, an informational content to be distributed;

distribution-condition-accepting means for accepting from the source terminal a distribution condition according to which the distribution content is distributed, the distribution condition including a stop condition;

distributee-candidate-determining means for determining one or more primary destination terminals to which the distribution content will be distributed, the primary destination terminals being selected from user terminals whose identifiers are correlatively stored with the identifier of the source terminal in the buddy list, in accordance with the distribution condition;

first distribution means for transmitting the distribution content to the one or more primary destination terminals; and distribution-catenating means for iteratively activating second distribution means respectively located in each of the user terminals that have received the distribution content, each second distribution means transmitting the distribution content, from any recipient user terminal to which the distribution content has been sent, to some or all of one or more destination user terminals selected by the second distribution means from user terminals whose identifiers are correlatively stored with the identifier of the recipient terminal in a buddy list of the recipient user terminal, in accordance with the distribution condition, until the stop condition is satisfied;

recording means for recording stop-condition candidates, wherein the stop-condition candidates are alternatives for the stop distribution condition; and selecting means for selecting at least one of the stop-condition candidates as the stop distribution condition by the source user terminal.

21. A computer-readable recording medium on which is recorded a information-distribution program utilized by a computer connected to user terminals via a network, the computer-readable recording medium on which is recorded a information- distribution program for executing:

accepting, from any of the user terminals, designation of at least one other user terminal among the user terminals;

storing a buddy list in which at least one identifier identifying a user terminal is correlated with at least one other identifier identifying the at least one other user terminal designated in said accepting designation;

accepting, from a source user terminal among the user terminals, an informational content to be distributed and a distribution condition according to which the distribution content is distributed, the distribution condition including a stop condition;

determining one or more primary destination user terminals to which the distribution content will be distributed, the primary destination user terminals being selected from user terminals whose identifiers are correlatively stored with the identifier of the source terminal in the buddy list, in accordance with the distribution condition;

transmitting the distribution content to the one or more primary destination user terminals;

until the stop condition is satisfied, by any recipient user terminal to which the distribution content has been sent, determining one or more destination user terminals to which the informational content will be distributed, the one or more destination user terminals being selected from user terminals whose identifiers are correlatively stored with the identifier of the recipient terminal in a buddy list, in accordance with the distribution condition, and transmitting the informational content the one or more destination user terminals, who become recipient user terminals upon receiving the informational contents;

recording stop-condition candidates, wherein the stop condition candidates are alternatives for the stop distribution condition; and selecting at least one of the stop-condition candidates as the stop distribution condition by the source user terminal.

22. A computer product, stored on a computer-readable recording medium, utilized by a computer connected to user terminals via a network, the computer product is executed by the computer to preform steps comprising:

accepting from any of the user terminals designation of at least one other user terminal among the user terminals;

storing a buddy list in which at least one identifier identifying a user terminal is correlated with at least one other identifier identifying the at least one other user terminal whose designation has been accepted by said designation-accepting means;

accepting, from a source user terminal among the user terminals, an informational content to be distributed;

accepting from the source terminal a distribution condition according to which the distribution content is distributed, the distribution condition including a stop condition;

determining one or more primary destination terminals to which the distribution content will be distributed, the primary destination terminals being selected from user terminals whose identifiers are correlatively stored with the identifier of the source terminal in the buddy list, in accordance with the distribution condition;

transmitting the distribution content to the one or more primary destination terminals;

transmitting the distribution content, by any recipient user terminal to which the distribution content has been sent, to some or all of one or more destination user terminals selected by the recipient user terminal from user terminals whose identifiers are correlatively stored with the identifier of the recipient terminal in the buddy list, in accordance with the distribution condition; and iteratively activating said second distribution means, until the stop condition is satisfied;

recording stop-condition candidates, wherein the stop-condition candidates are alternatives for the stop distribution condition; and selecting at least one of the stop-condition candidates as the stop distribution condition by the source user terminal.

23. An information-distribution method for a system including a computer and user terminals connected via a network, the information-distribution method including:

providing distribution content to be distributed and a stop distribution condition to the computer by a source user terminal among the user terminals;

determining one or more destination terminals to which the distribution content is distributed by the computer based on a buddy list corresponding to the source terminal, transmitted by the source terminal with the distribution content;

first transmitting the distribution content from the computer to the one or more destination terminals;

iteratively, until the stop condition is met, determining one or more destination terminals to which the distribution content to be distributed by any recipient terminal who has received the distribution content, distributing the distribution content from the recipient terminal to the one or more destination terminals;

recording stop-condition candidates, wherein the stop condition candidates are alternatives for the stop distribution condition; and selecting at least one of the stop-condition candidates as the stop distribution condition by the source user terminal.

24. An information-distribution method for a system including a computer and user terminals connected via a network, the information-distribution method including:

distributing a distribution content provided by a first user terminal to the computer, to one or more second user terminals identified on a buddy list as corresponding to the first user terminal;

distributing the distribution content from user terminals that received the distribution content to one or more user terminals identified in buddy lists of the respective user terminals until a stop distribution condition provided by the first terminal is met, wherein any user terminal that has received distribution content determines the one or more user terminals to which to distribute the content if the stop distribution condition has not been met;

recording Stop-condition candidates, wherein the stop condition candidates are alternatives for the stop distribution condition; and selecting at least one of the stop-condition candidates as the stop distribution condition by the source user terminal.

* * * * *

UNITED STATES PATENT AND TRADEMARK OFFICE
CERTIFICATE OF CORRECTION

| | |
|---|---|
| PATENT NO. | : 7,664,817 B2 |
| APPLICATION NO. | : 10/067297 |
| DATED | : February 16, 2010 |
| INVENTOR(S) | : Satoru Watanabe et al. |

It is certified that error appears in the above-identified patent and that said Letters Patent is hereby corrected as shown below:

Column 23, Line 13, change "Status" to --status--.

Column 23, Line 52, change "wherein further" to --further--.

Column 24, Line 33, change "to selected" to --selected--.

Column 24, Line 45, change "setter- user" to --setter-user--.

Column 25, Line 65, change "information- distribution" to --information-distribution--.

Column 26, Line 26, change "content the" to --content to the--.

Column 26, Lines 28-29, change "contents;" to --content;--.

Column 26, Line 39, change "preform" to --perform--.

Column 27, Line 26, change "who" to --which--.

Column 28, Line 22, change "Stop-condition" to --stop-condition--.

Signed and Sealed this

First Day of June, 2010

David J. Kappos
*Director of the United States Patent and Trademark Office*